US012606703B2

(12) United States Patent
Dikovsky et al.

(10) Patent No.: US 12,606,703 B2
(45) Date of Patent: Apr. 21, 2026

(54) ADDITIVE MANUFACTURING USING MATERIALS THAT FORM A WEAK GEL

(71) Applicant: Stratasys Ltd., Rehovot (IL)

(72) Inventors: Daniel Dikovsky, Ariel (IL); Nissim David, Netanya (IL)

(73) Assignee: Stratasys Ltd., Rehovot (IL)

( * ) Notice: Subject to any disclaimer, the term of this patent is extended or adjusted under 35 U.S.C. 154(b) by 114 days.

(21) Appl. No.: 18/138,759

(22) Filed: Apr. 25, 2023

(65) Prior Publication Data

US 2023/0257577 A1 Aug. 17, 2023

Related U.S. Application Data

(62) Division of application No. 17/419,761, filed as application No. PCT/IL2019/051441 on Dec. 31, 2019, now Pat. No. 11,667,787.

(Continued)

(51) Int. Cl.
*B29C 64/124* (2017.01)
*B29C 64/40* (2017.01)
(Continued)

(52) U.S. Cl.
CPC ............ *C08L 71/02* (2013.01); *B29C 64/124* (2017.08); *B29C 64/40* (2017.08); *B33Y 10/00* (2014.12);
(Continued)

(58) Field of Classification Search
CPC .. C08L 71/02; C08L 2205/035; B29C 64/124; B29C 64/40; B33Y 10/00; B33Y 70/00
See application file for complete search history.

(56) References Cited

U.S. PATENT DOCUMENTS 6,228,923 B1 5/2001 Lombardi et al.
6,259,962 B1 7/2001 Gothait
(Continued)

FOREIGN PATENT DOCUMENTS

CN 107921703 4/2018
JP 2017078123 * 4/2017
(Continued)

OTHER PUBLICATIONS

English language translation of JP 2017/078123 (Year: 2017).*
(Continued)

*Primary Examiner* — Larry W Thrower

(57) ABSTRACT

A formulation usable in additive manufacturing of a three-dimensional object is provided. The formulation comprises one or more monofunctional curable material(s); one or more hydrophilic multifunctional curable material(s); and one or more water-miscible non-curable material(s), such that a total amount of the curable materials is 20% or less, by weight, and a weight ratio of a total weight of the monofunctional curable material(s) and a total weight of the hydrophilic multifunctional curable material(s) ranges from 1:1 to 10:1. The formulation features, when hardened, properties of a weak and flowable gel. Additive manufacturing processes utilizing the formulation as a support material formulation are also provided.

11 Claims, 12 Drawing Sheets

Related U.S. Application Data

(60) Provisional application No. 62/786,809, filed on Dec. 31, 2018.

(51) Int. Cl.
*B33Y 10/00* (2015.01)
*B33Y 70/00* (2020.01)
*C08L 71/02* (2006.01)
*B29K 105/00* (2006.01)

(52) U.S. Cl.
CPC ...... *B33Y 70/00* (2014.12); *B29K 2105/0061* (2013.01); *C08L 2205/035* (2013.01)

(56) References Cited

U.S. PATENT DOCUMENTS

| | | | |
|---|---|---|---|
| 6,569,373 B2 | 5/2003 | Napadensky | |
| 6,658,314 B1 | 12/2003 | Gothait | |
| 6,850,334 B1 | 2/2005 | Gothait | |
| 7,183,335 B2 | 2/2007 | Napadensky | |
| 7,209,797 B2 | 4/2007 | Kritchman et al. | |
| 7,225,045 B2 | 5/2007 | Gothait et al. | |
| 7,255,825 B2 | 8/2007 | Nielsen et al. | |
| 7,300,619 B2 | 11/2007 | Napadensky et al. | |
| 7,479,510 B2 | 1/2009 | Napadensky et al. | |
| 7,500,846 B2 | 3/2009 | Eshed et al. | |
| 7,962,237 B2 | 6/2011 | Kritchman | |
| 9,227,365 B2 | 1/2016 | Dikovsky et al. | |
| 2010/0191360 A1 | 7/2010 | Napadensky | |
| 2017/0252971 A1 | 9/2017 | Umcbayashi | |
| 2018/0061279 A1* | 3/2018 | Niimi | G09B 23/285 |
| 2022/0089868 A1 | 3/2022 | Dikovsky et al. | |

FOREIGN PATENT DOCUMENTS

| | | |
|---|---|---|
| JP | 2018-036524 | 3/2018 |
| JP | 2018-127007 | 8/2018 |
| JP | 2018-526481 | 8/2018 |
| JP | 2018-525473 | 9/2018 |
| WO | WO 2017/029657 | 2/2017 |
| WO | WO 2017/208238 | 12/2017 |
| WO | WO 2019/021291 | 1/2019 |
| WO | WO 2019/021292 | 1/2019 |
| WO | WO 2019/021295 | 1/2019 |
| WO | WO 2020/141521 | 7/2020 |

OTHER PUBLICATIONS

English Summary Dated Mar. 27, 2024 of Notification of Office Action Dated Mar. 13, 2024 From the National Intellectual Property Administration of the People's Republic of China Re. Application No. 201980091258.8. (3 Pages).

Notification of Office Action Dated Mar. 13, 2024 From the National Intellectual Property Administration of the People's Republic of China Re. Application No. 201980091258.8 and Its Machine Translation Into English. (9 Pages).

Office Action Dated May 23, 2024 From the Israel Patent Office Re. Application No. 284525. (6 Pages).

Notice of Reason(s) for Rejection Dated Oct. 17, 2023 From the Japan Patent Office Re. Application No. 2021-536707. (2 pages).

Final Official Action Dated Sep. 19, 2022 From the US Patent and Trademark Office Re. U.S. Appl. No. 17/419,761. (5 Pages).

International Preliminary Report on Patentability Dated Jul. 15, 2021 From the International Bureau of WIPO Re. Application No. PCT/IL2019/051441. (10 Pages).

International Search Report and the Written Opinion Dated Apr. 6, 2020 From the International Searching Authority Re. Application No. PCT/IL2019/051441. (13 Pages).

Notice of Allowance Dated Jan. 25, 2023 from the US Patent and Trademark Office Re. U.S. Appl. No. 17/419,761. (7 pages).

Official Action Dated May 12, 2022 from US Patent and Trademark Office Re. U.S. Appl. No. 17/419,761. (12 pages).

Restriction Official Action Dated Jan. 24, 2022 From the US Patent and Trademark Office Re. U.S. Appl. No. 17/419,761. (6 Pages).

Communication Pursuant to Article 94(3) EPC Dated Sep. 13, 2024 From the European Patent Office Re. Application No. 19839161.7. (6 Pages).

Translation Dated Nov. 1, 2023 of Notice of Reason(s) for Rejection Dated Oct. 17, 2023 From the Japan Patent Office Re. Application No. 2021-536707. (2 pages).

Translation Dated Apr. 10, 2024 Notification of Office Action Dated Mar. 13, 2024 From the National Intellectual Property Administration of the People's Republic of China Re. Application No. 201980091258.8. (9 Pages).

Notification of Office Action and Search Report Dated Sep. 13, 2023 From the State Intellectual Property Office of the People's Republic of China Re. Application No. 201980091258.8. (6 Pages).

Translation Dated Sep. 26, 2023 Notification of Office Action Dated Sep. 13, 2023 From the State Intellectual Property Office of the People's Republic of China Re. Application No. 201980091258.8. (2 Pages).

Communication Pursuant to Article 94(3) EPC Dated Sep. 25, 2025 From the European Patent Office Re. Application No. 19839161.7 (5 Pages).

Communication Pursuant to Article 94(3) EPC Dated Mar. 21, 2025 From the European Patent Office Re. Application No. 19839161.7 (5 Pages).

* cited by examiner

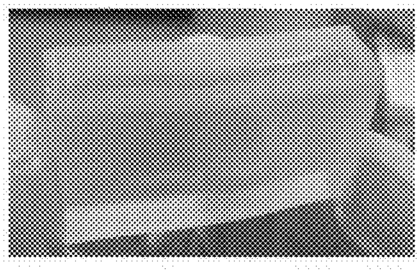
FIG. 5A
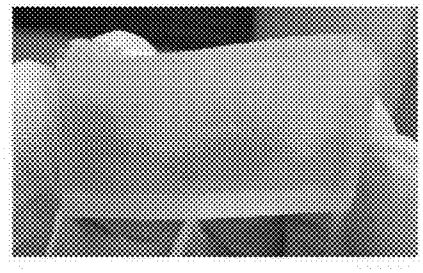
FIG. 5B
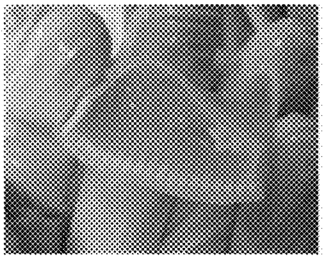
FIG. 5C
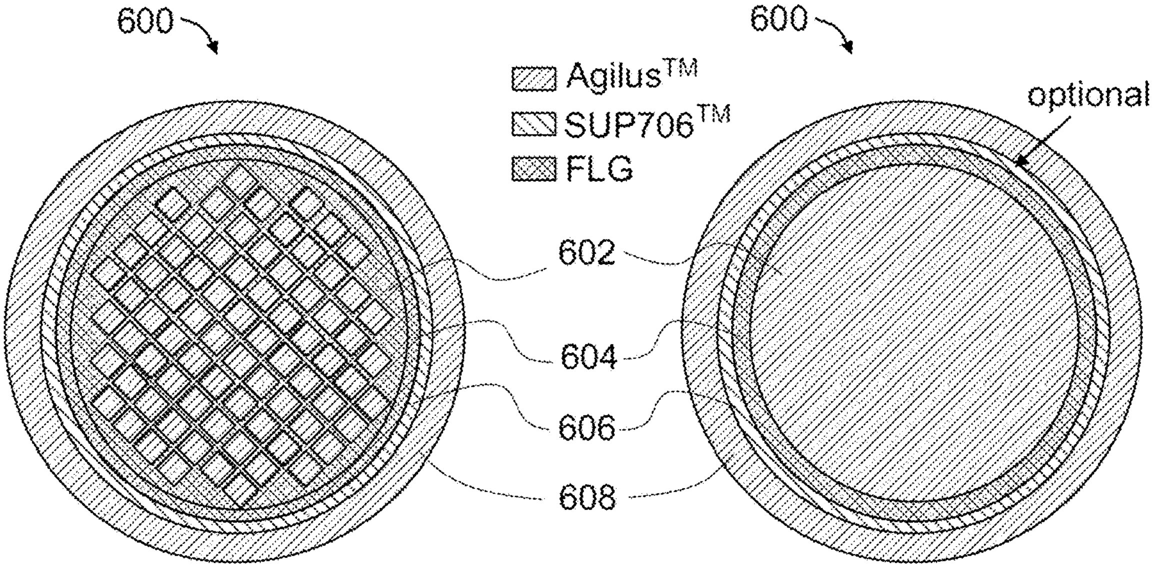
FIG. 6A
FIG. 6B

ADDITIVE MANUFACTURING USING MATERIALS THAT FORM A WEAK GEL

RELATED APPLICATIONS

This application is a Division of U.S. patent application Ser. No. 17/419,761, filed on Jun. 30, 2021, which is a National Phase of PCT Patent Application No. PCT/IL2019/051441 having International Filing Date of Dec. 31, 2019, which claims the benefit of priority under 35 USC § 119(e) of U.S. Provisional Patent Application No. 62/786,809 filed on Dec. 31, 2018. The contents of the above applications are all incorporated by reference as if fully set forth herein in their entirety.

FIELD AND BACKGROUND OF THE INVENTION

The present invention, in some embodiments thereof, relates to additive manufacturing and, more particularly, but not exclusively, to curable formulations which provide, when hardened, materials featuring properties of a weak gel, and to additive manufacturing of three-dimensional objects using same.

Additive manufacturing (AM) is generally a process in which a three-dimensional (3D) object is manufactured utilizing a computer model of the objects. Such a process is used in various fields, such as design related fields for purposes of visualization, demonstration and mechanical prototyping, as well as for rapid manufacturing (RM). The basic operation of any AM system consists of slicing a three-dimensional computer model into thin cross sections, translating the result into two-dimensional position data and feeding the data to control equipment which manufacture a three-dimensional structure in a layerwise manner.

One type of AM is three-dimensional inkjet printing processes. In this process, a building material is dispensed from a dispensing head having a set of nozzles to deposit layers on a supporting structure. Depending on the building material, the layers may then be cured or solidified using a suitable device.

Various three-dimensional inkjet printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237.

Several AM processes allow additive formation of objects using more than one modeling material. For example, U.S. Pat. No. 9,031,680 of the present Assignee, discloses a system which comprises a solid freeform fabrication apparatus having a plurality of dispensing heads, a building material supply apparatus configured to supply a plurality of building materials to the fabrication apparatus, and a control unit configured for controlling the fabrication and supply apparatus. The system has several operation modes. In one mode, all dispensing heads operate during a single building scan cycle of the fabrication apparatus. In another mode, one or more of the dispensing heads is not operative during a single building scan cycle or part thereof.

The building materials may include modeling materials and support materials, which form the object and the temporary support constructions supporting the object as it is being built, respectively.

The modeling material, also referred to herein as "model material", (which may include one or more material(s), included in one or more formulations) is deposited to produce the desired object/s.

The support material, also known in the art as "supporting material", (which may include one or more material(s)) is used, with or without modeling material elements, is used to support specific areas of the object during building and for assuring adequate vertical placement of subsequent object layers. For example, in cases where objects include over-hanging features or shapes, e.g. curved geometries, negative angles, voids, and the like, objects are typically constructed using adjacent support constructions, which are used during the printing.

In all cases, the support material is deposited in proximity of the modeling material, enabling the formation of complex object geometries and filling of object voids.

In all of the currently practiced technologies, the deposited support material and modeling material are hardened, typically upon exposure to a curing condition (e.g., curing energy), to form the required layer shape. After printing completion, support structures are removed to reveal the final shape of the fabricated 3D object.

When using currently available commercial print heads, such as ink-jet printing heads, the support material should have a relatively low viscosity (about 10-20 cPs) at the working, i.e., jetting, temperature, such that it can be jetted. Further, the support material should harden rapidly in order to allow building of subsequent layers. Additionally, the hardened support material should have sufficient mechanical strength for holding the model material in place, and low distortion for avoiding geometrical defects.

Known methods for removal of support materials include mechanical impact (applied by a tool or water-jet), as well as chemical methods, such as dissolution in a solvent, with or without heating. The mechanical methods are labor intensive and are often unsuited for small intricate parts.

For dissolving the support materials, the fabricated object is often immersed in water or in a solvent that is capable of dissolving the support materials. The solutions utilized for dissolving the support material are also referred to herein and in the art as "cleaning solutions". In many cases, however, the support removal process may involve hazardous materials, manual labor and/or special equipment requiring trained personnel, protective clothing and expensive waste disposal. In addition, the dissolution process is usually limited by diffusion kinetics and may require very long periods of time, especially when the support constructions are large and bulky. Furthermore, post-processing may be necessary to remove traces of a 'mix layer' on object surfaces. The term "mix layer" refers to a residual layer of mixed hardened model and support materials formed at the interface between the two materials on the surfaces of the object being fabricated, by model and support materials mixing into each other at the interface between them.

Additionally, methods requiring high temperatures during support removal may be problematic since there are model materials that are temperature-sensitive, such as waxes and certain flexible materials. Both mechanical and dissolution methods for removal of support materials are especially problematic for use in an office environment, where ease-of-use, cleanliness and environmental safety are major considerations.

Water-soluble materials for 3D building are described, for example, in U.S. Pat. No. 6,228,923, where a water soluble thermoplastic polymer—Poly(2-ethyl-2-oxazoline)—is taught as a support material in a 3D building process involving high pressure and high temperature extrusion of ribbons of selected materials onto a plate.

A water-containing support material comprising a fusible crystal hydrate is described in U.S. Pat. No. 7,255,825.

Formulations suitable for forming a hardened support material in building a 3D object are described, for example, in U.S. Pat. Nos. 7,479,510, 7,183,335 and 6,569,373, all to the present Assignee. Generally, the compositions disclosed in these patents comprise at least one UV curable (reactive) component, e.g., an acrylic component, at least one non-UV curable component, e.g. a polyol or glycol component, and a photoinitiator. After irradiation, these compositions provide a semi-solid or gel-like material capable of dissolving or swelling upon exposure to water, to an alkaline or acidic solution or to a water detergent solution.

Besides swelling, another characteristic of such a support material may be the ability to break down during exposure to water, to an alkaline or acidic solution or to a water detergent solution because the support material is made of hydrophilic components. During the swelling process, internal forces cause fractures and breakdown of the hardened support. In addition, the support material can contain a substance that liberates bubbles upon exposure to water, e.g. sodium bicarbonate, which transforms into $CO_2$ when in contact with an acidic solution. The bubbles aid in the process of removal of support from the model.

Several additive manufacturing processes allow additive formation of objects using more than one modeling material. For example, U.S. Patent Application having Publication No. 2010/0191360, of the present Assignee, discloses a system which comprises a solid freeform fabrication apparatus having a plurality of dispensing heads, a building material supply apparatus configured to supply a plurality of building materials to the fabrication apparatus, and a control unit configured for controlling the fabrication and supply apparatus. The system has several operation modes. In one mode, all dispensing heads operate during a single building scan cycle of the fabrication apparatus. In another mode, one or more of the dispensing heads is not operative during a single building scan cycle or part thereof.

In a 3D inkjet printing process such as Polyjet™ (Stratasys Ltd., Israel), the building material is selectively jetted from one or more printing heads and deposited onto a fabrication tray in consecutive layers according to a predetermined configuration as defined by a software file.

U.S. Pat. No. 9,227,365, by the present assignee, discloses methods and systems for solid freeform fabrication of shelled objects, constructed from a plurality of layers and a layered core constituting core regions and a layered shell constituting envelope regions.

Additive Manufacturing processes have been used to form rubber-like materials. For example, rubber-like materials are used in PolyJet™ systems as described herein. These materials are formulated to have relatively low viscosity permitting dispensing, for example by inkjet, and to develop Tg which is lower than room temperature, e.g., −10° C. or lower. The latter is obtained by formulating a product with relatively low degree of cross-linking and by using monomers and oligomers with intrinsic flexible molecular structure (e.g., acrylic elastomers).

An exemplary family of Rubber-like materials usable in PolyJet™ systems (marketed under the trade name “Tango™” family) offers a variety of elastomer characteristics of the obtained hardened material, including Shore A hardness, Elongation at break, Tear Resistance and Tensile strength.

Another family of Rubber-like materials usable in PolyJet™ systems (marketed under the trade name “Agilus™” family) is described in PCT International Application No. IL2017/050604 (Published as WO2017/208238), by the present assignee, and utilizes a curable elastomeric formulation that comprises an elastomeric curable material and silica particles.

PCT International Patent Applications Publication Nos. WO 2019/021291, WO 2019/021292 and WO 2019/021295, all by the present Assignee, describe formulations that are usable in additive manufacturing of three-dimensional objects, and which provide, upon exposure to a curing condition, a liquid or liquid-like material.

SUMMARY OF THE INVENTION

According to an aspect of some embodiments of the present invention there is provided a formulation usable in additive manufacturing of a three-dimensional object, which is also referred to herein as an FG formulation, which comprises:

at least one monofunctional curable material;

at least one hydrophilic multifunctional curable material; and at least one water-miscible non-curable material, wherein a total amount of the curable materials is 20% or less, by weight, of the total weight of the formulation, and wherein a weight ratio of a total weight of the at least one monofunctional curable material and a total weight of the at least one hydrophilic multifunctional curable material ranges from 1:1 to 10:1.

According to some of any of the embodiments described herein, a total amount of the at least one monofunctional curable material ranges from 1 to 10, or from 3 to 10, or from 5 to 10, % by weight, of the total weight of the formulation.

According to some of any of the embodiments described herein, a total amount of the at least one hydrophilic multifunctional curable material ranges from 1 to 5, % by weight, of the total weight of the formulation.

According to some of any of the embodiments described herein, the at least one hydrophilic multifunctional curable material provides, when hardened per se, a material that is water insoluble.

According to some of any of the embodiments described herein, at least one of the monofunctional curable material(s) comprises a hydrophilic monofunctional curable material.

According to some of any of the embodiments described herein, at least one of the monofunctional curable material(s) comprises a hydroxyalkyl and/or an alkylene glycol moiety.

According to some of any of the embodiments described herein, at least one of the hydrophilic multifunctional curable material(s) comprises one or more alkylene glycol moieties.

According to some of any of the embodiments described herein, the at least one non-curable material is a water-soluble or water-miscible material.

According to some of any of the embodiments described herein, the at least one non-curable material comprises a polymeric material.

According to some of any of the embodiments described herein, the at least one non-curable material further comprises a non-polymeric material.

According to some of any of the embodiments described herein, a weight ratio of a total weight of the at least one polymeric non-curable material and a total weight of the at least one non-polymeric non-curable material ranges from 2:1 to 1:2.

According to some of any of the embodiments described herein, the formulation comprises: the at least one monofunctional curable material, in an amount of from 3 to 10, % by weight; the at least one multifunctional curable material in an amount of from 3 to 5, % by weight; at least one polymeric non-curable material in an amount of from 30 to 60, % by weight; and at least one non-polymeric non-curable material in an amount of from 30 to 60, % by weight, wherein a total amount of the non-curable materials is at least 80% by weight.

According to some of any of the embodiments described herein, the formulation is devoid of water.

According to some of any of the embodiments described herein, the formulation features a viscosity of from 8 to 40 centipoises at 75° C., as measured using a Brookfield viscometer.

According to some of any of the embodiments described herein, the additive manufacturing is 3D inkjet printing.

According to some of any of the embodiments described herein, the formulation features, when hardened, Young's modulus of from 10 to 100, or from 10 to 80 kPa.

According to some of any of the embodiments described herein, the formulation features, when hardened, a gel material that is flowable upon application of positive pressure.

According to some of any of the embodiments described herein, the pressure ranges from 0.1 to 1.5 bars, or from 0.2 to 1.2 bars, or from 0.2 to 1 bar.

According to some of any of the embodiments described herein, each of the curable materials is a UV-curable material.

According to some of any of the embodiments described herein, each of the curable materials is an acrylic material.

According to some of any of the embodiments described herein, the formulation further comprises a photoinitiator.

According to some of any of the embodiments described herein, an amount of the photoinitiator is no more than 2% by weight of the total weight of the formulation.

According to an aspect of some embodiments of the present invention there is provided a method of additive manufacturing of a three-dimensional object, the method comprising sequentially forming a plurality of layers in a configured pattern corresponding to the shape of the object, thereby forming the object, wherein the formation of at least a few of the layers comprises:

dispensing at least two building material formulations, the at least two building material formulations comprise a modeling material formulation M which, upon exposure to a curing condition, forms a hardened modeling material M, and an FG formulation according to any of the respective embodiments described herein, which, upon exposure to the curing condition, forms a hardened support material FG.

According to some of any of the embodiments described herein, the dispensing is such that the hardened modeling material M forms at least one hollow structure, and the material FG is at least partially enclosed in the hollow structure.

According to some of any of the embodiments described herein, the hollow structure is selected from a tubular structure, a branched tubular structure, and a plurality of tubular structures entangled with one another.

According to some of any of the embodiments described herein, a diameter of at least one of the tubular structures is less than 1 cm.

According to some of any of the embodiments described herein, the material FG is completely enclosed in the hollow structure.

According to an aspect of some embodiments of the present invention there is provided a method of additive manufacturing of a three-dimensional object having a cavity, the method comprising sequentially forming a plurality of layers in a configured pattern corresponding to a combined shape of the object and a sacrificial object, in a manner that the sacrificial object is enclosed in by a sacrificial shell, and the sacrificial shell is enclosed in the cavity; and removing the sacrificial object and the sacrificial shell from the cavity;

wherein the sacrificial object comprises a modeling material M, and the sacrificial shell is made of a support material FG formed of the FG formulation as described herein in any of the respective embodiments.

According to some of any of the embodiments described herein, the sacrificial object also comprises the FG material, the FG material being reinforced by the modeling material M.

According to some of any of the embodiments described herein, the modeling material M occupies from about 60% to about 80% of a volume of the sacrificial object.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

FIGS. 5A-5C present photographs of an object printed with a DM core made of an exemplary FG formulation and a grid of an Agilus™ modeling formulation M and a coating made of Agilus™ as material M (about 1 mm) (FIG. 5A), and of the same object upon immersing it a 2% NaOH solution (FIG. 5B) and upon complete dissolution of the hardened material FG (FIG. 5C).

Figure 7A:
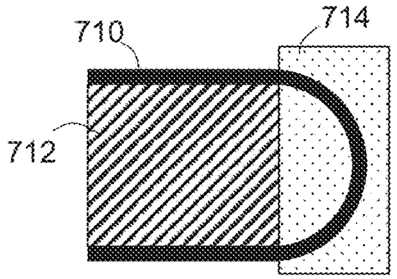
Figure 7B:
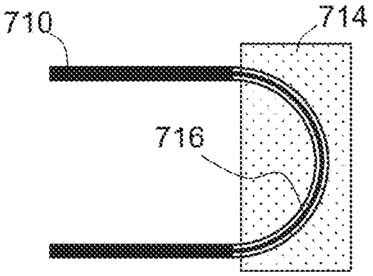
Figure 7C:
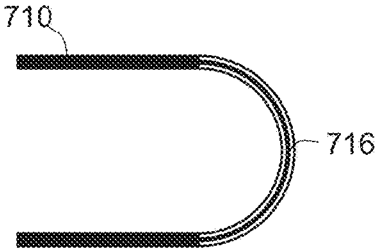

FIGS. 6A and 6B present schematic illustrations of digital material modes that can be performed in additive manufacturing methods employing exemplary formulations according to some of the present embodiments;

FIGS. 7A-7C present schematic presentations of a "dog bone" model fabricated in experiments performed according to some embodiments of the present invention.

Figure 8:
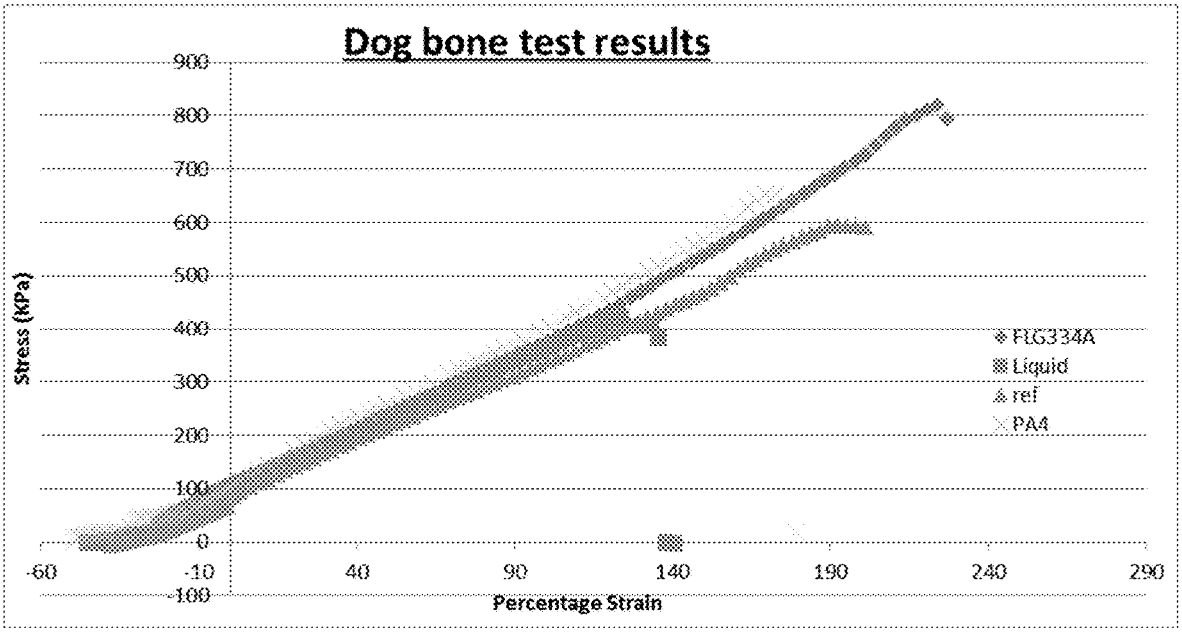

FIG. 8 presents comparative plots showing the tear resistance of dog bone models prepared while employing an Agilus™ formulation as the modeling formulation M and exemplary FG formulations according to the present embodiments, SUP706 or a liquid formulation L, as the support material formulation.

Figure 9:
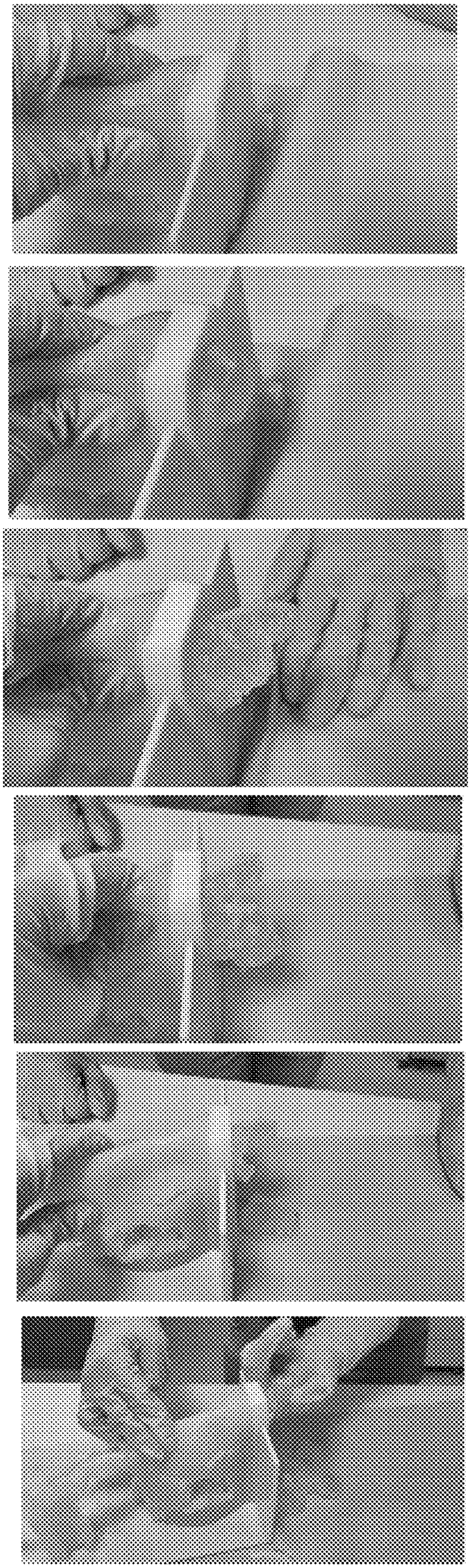
Figure 10:
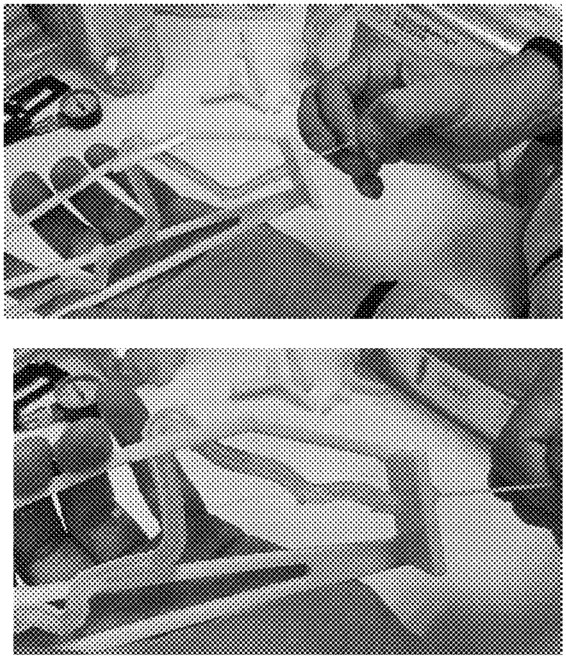
Figure 11:
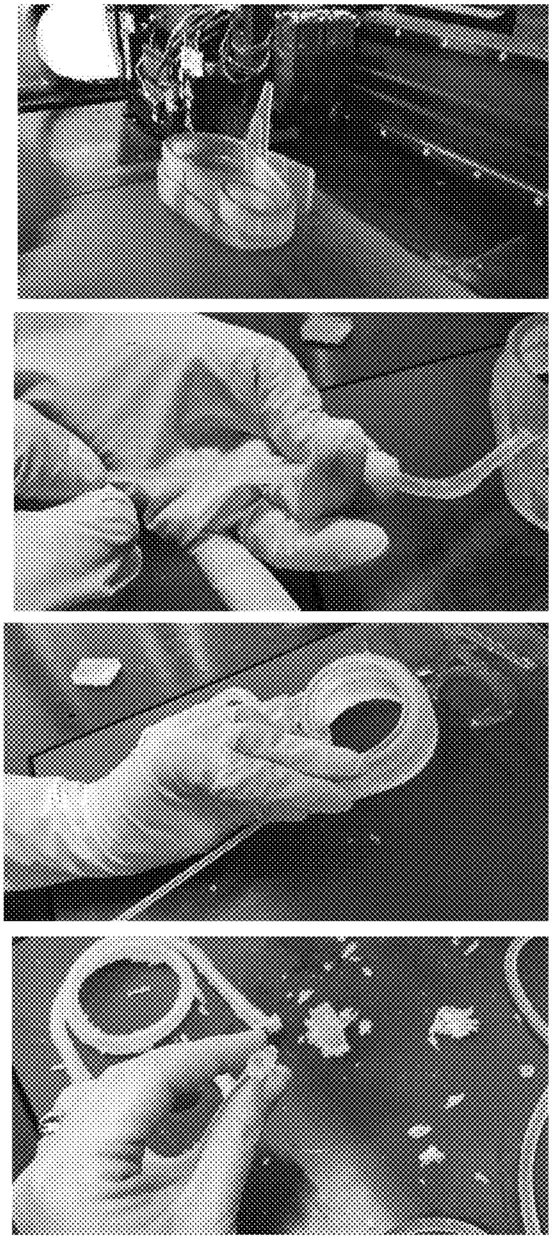

FIGS. 9, 10 and 11 present series of photographs presenting the removal of an FG material according to some of the present embodiments from models having hollow structures.

Figure 12A:
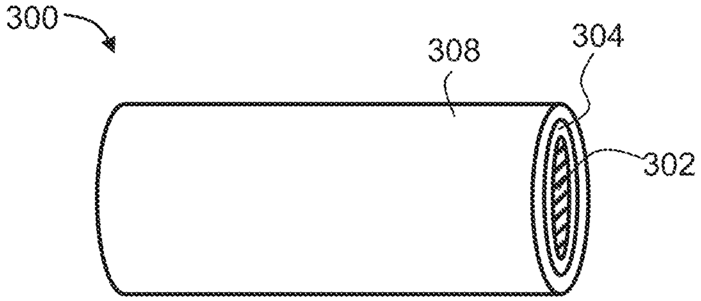
Figure 12B:
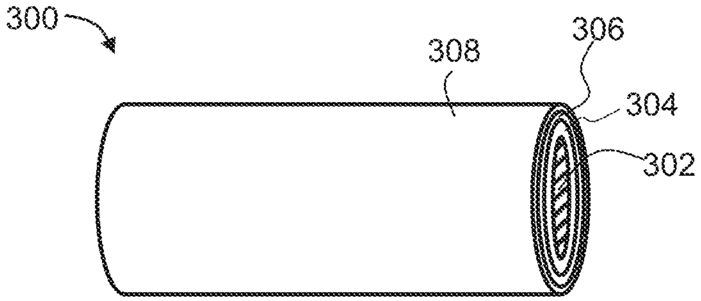

FIGS. 12A and 12B are schematic illustrations of a tubular structure according to some embodiments of the present invention.

DESCRIPTION OF SPECIFIC EMBODIMENTS OF THE INVENTION

The present invention, in some embodiments thereof, relates to additive manufacturing and, more particularly, but not exclusively, to curable formulations which provide, when hardened, materials featuring properties of a weak gel, and to additive manufacturing of three-dimensional objects using same.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors have realized that while practicing currently known additive manufacturing processes for fabricating three-dimensional objects, difficulties are observed in the formation and cleaning of parts that have intricate geometries, for example, geometries that contain hollow structures, such as cavities, enclosed volumes, thin and/or entangled and/or branched hollow tubular structures (e.g., pipes, tunnels), and sponge-like structures, which feature a narrow opening or are completely enclosed. Non-limiting exemplary objects featuring such intricate geometries are objects featuring structures of bodily organs such as a blood vessel, inner parts of a bone, and a heart.

More specifically, the present inventors have realized that when fabricating such objects, using, for example, 3D-inkjet printing, intricate parts of the object such as cavities, enclosed volumes, entangled and branched tubes, pipes and/or tunnel systems, are typically filled with a support material, typically a material featuring properties of a gel, whereby removal of the support material upon object fabrication via conventional mechanical and/or chemical techniques is difficult to perform, inefficient and time-consuming, and moreover, causes damage to the intricate parts and/or the entire object.

Mechanical techniques for support material removal, such as water jet and compressed air, are inefficient in case of enclosed or partially enclosed hollow structures since the physical accessibility of the jet to the support material is limited, and the applied pressure required for complete removal of the support material may damage the object. Chemical techniques for support material removal, which involve dissolution of the support material upon contacting a cleaning solution, are inefficient in case of enclosed or partially enclosed hollow structures since it requires diffusion of the cleaning solution to these portions of the object.

As discussed hereinabove, currently practiced support material formulations typically include curable and non-curable materials, which, when hardened, form gel or gel-like materials.

Herein and in the art, the term "gel" describes a material, often referred to as a semi-solid material, which comprises a three-dimensional solid network, typically made of fibrous structures chemically or physically linked therebetween, and a liquid phase encaged within this network. Gels are typically characterized by a consistency of a solid (e.g., are non-fluidic), and feature relatively low Tensile strength, relatively low Shear Modulus, e.g., lower than 100 kPa, and a Shear Loss Modulus to Shear Storage modulus (tan delta, $G''/G'$) value lower than 1. Gels can be characterized as flowable when subjected to a positive pressure of at least 0.5 bar, preferably at least 1 bar, or higher, or, alternatively, as non-flowable when subjected to a pressure lower than 1 bar or lower than 0.5 bar or of 0.3 bar or lower.

Gel-like materials according to the present embodiments are typically soft materials, which can be gels or solids, which feature mechanical and rheological properties of a gel, as described herein.

Currently practiced support material formulations typically comprise a mixture of curable and non-curable materials, and, when hardened, form hardened support materials which are also referred to herein as gel-like support material or as gel support material (e.g., Material S).

Most of the currently practiced hardened support materials are typically water miscible, or water-dispersible or water-soluble, as defined herein.

PCT International Patent Application Publication Nos. WO 2019/021291, WO 2019/021292 and WO 2019/021295, all by the present Assignee, describe formulations that are usable in additive manufacturing of three-dimensional objects, and which provide, upon exposure to a curing condition, a liquid or liquid-like material.

The present inventors have conceived utilizing curable formulations that form a weak gel material upon exposure to a curing condition.

Herein and in the art, the term "gel" describes a material, often referred to as a semi-solid material, which comprises a three-dimensional solid network, typically made of fibrous structures chemically or physically linked therebetween, and a liquid phase encaged within this network. Gels are typically characterized by a consistency of a solid (e.g., are non-fluidic), and feature relatively low Tensile strength, relatively low Shear Modulus, e.g., lower than 100 kPa, and a Shear Loss Modulus to Shear Storage modulus (tan delta, G"/G') value lower than 1. Gels are typically characterized as being flowable when subjected to a positive pressure of at least 0.5 bar, preferably at least 1 bar, or higher, and as being non-flowable when subject to a pressure lower than 1 bar or lower than 0.5 bar or of 0.3 bar or lower.

Gel-like materials are typically soft materials, which can be gels or solids, which feature mechanical and rheological properties of a gel. By "weak gel" it is meant a material featuring a gel consistency at room temperature and a Shear modulus at the middle to lower range of gels, that is, lower than 80 kPa, or lower than 50 kPa or lower.

The present inventors have devised formulations that provide such weak gels, which further exhibit flowability when subjected to a relatively low pressure, for example, in a range of from 0.1 bar to 1.5 bars, or from 0.2 bar to 1.5 bar, or from 0.1 bar to 1.2 bars, or from 0.2 bar to 1.2 bars, or from 0.2 bar to 1 bar, or from 0.5 bar to 1.5 bars, or from 0.5 bar to 1 bar, or from 0.1 bar to 0.8 bar, or from 0.2 bar to 0.8 bar, or from 0.5 bar to 0.8 bar, or from 0.1 bar to 0.5 bar, or from 0.2 bar to 0.5 bar, including any intermediate values and subranges therebetween. Such formulations are also referred to herein as FG formulations or formulations FG or as flowing gel formulations. The material formed when these formulations are hardened is referred to herein as Material FG or an FG material or as flowing gel material or as flowing gel hardened material.

Herein throughout, the term "printed object" or "fabricated object" describes a product of the additive manufacturing process. This term refers to the product obtained by a method as described herein, before removal of the support material (e.g., the FG material optionally in combination with a support material S). A printed object is therefore made of hardened (e.g., cured) modeling material and hardened (e.g., cured) support material.

The term "printed object" as used herein throughout refers to a whole printed object or a part thereof.

The terms "model object", "final object", "object" and "model", as used herein, describe a final product of the manufacturing process. This term refers to the product obtained by a method as described herein, after removal of the support material(s). The model therefore essentially consists of a hardened (solidified, cured) modeling material, unless otherwise indicated.

The terms "model", "model object", "final object" and "object", as used herein throughout, refer to a whole object or a part thereof.

By "hollow structure" in an object it is meant that the object comprises one or more parts that have cavities (non-solid portions) therein. The cavity can be completely or partially enclosed by the solid material. When partially enclosed, the cavity can feature a narrow opening (e.g., less than 10 mm in diameter) to the outermost surface of the object. The cavities can be of any shape, for example, tubular, spherical, cylindrical, cuboidal, pyramidal, and of more complexed shapes, such as, but not limited to, non-simply connected shape, including, for example, entangled and/or branched shapes (e.g., entangled and/or branched tunnels and/or pipes).

In some embodiments, the cavity has at least one dimension at the millimeter scale, that is, from 0.1 mm to 10 mm, or from 0.1 mm to 8 mm, or from 0.1 mm to 5 mm, or from 1 mm to 5 mm.

Exemplary hollow structures include, but are not limited to, thin tubular structures, such as tubes, pipes and tunnels, which can be branched and/or entangled, and which have in at least a portion thereof a diameter at the millimeter scale, as defined herein.

In some embodiments, the cavity is fully-enclosed, that is, it is an inner hollow structure within the object that is not exposed to an environment surrounding the object. Such an inner hollow structure can be of any shape/geometry, as described herein, and its dimensions can range from a millimeter scale, as defined herein, to a few centimeters (e.g., 1-20, or 1-10, or 1-5 cm) and up to 30, 40, 50 cm and even more.

Exemplary such objects include, but are not limited to, sealed bottles, cups, and any other sealed receptacle.

Embodiments of the present invention relate to a novel formulation which provides a flowing gel (FG) material as defined herein, and to systems and methods employing these formulations in additive manufacturing of a three-dimensional object as described herein. The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

Each layer is formed by additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material formulation is dispensed from a dispensing head having one or more nozzles arrays to deposit building material formulation in layers on a supporting structure. The AM apparatus thus dispenses building material formulation in target locations which are to be occupied and leaves other target locations void. The apparatus typically includes a plurality of dispensing heads, each of which can be configured to dispense a different building material formulation from the or different nozzle array. Thus, different target locations can be occupied by different building material formulations.

Herein throughout, some embodiments of the present invention are described in the context of the additive manufacturing being a 3D inkjet printing. However, other additive manufacturing processes, such as, but not limited to, SLA and DLP, as described in further detail hereinbelow, are contemplated.

An uncured building material can comprise one or more modeling material formulations, and can be dispensed such that different parts of the object are made, upon curing, of different cured modeling formulations or different combinations thereof, and hence are made of different cured modeling materials or different mixtures of cured modeling materials.

The formulations forming the building material (modeling material formulations and optionally support material formulations) comprise one or more curable materials, which, when exposed to a curing condition (e.g., curing energy), form hardened (e.g., cured, solidified) material.

Herein throughout, a "curable material" is a compound (typically a monomeric or oligomeric compound, yet optionally a polymeric material) which, when exposed to a curing condition (e.g., curing energy), as described herein, solidifies or hardens to form a cured material. Curable materials are typically polymerizable materials, which undergo polymerization and/or cross-linking when exposed to suitable curing condition, typically a source of energy.

A curable material, according to the present embodiments, can harden or solidify (cure) while being exposed to a curing condition which can be a curing energy, and/or to another curing condition such as contact with a chemical reagent or exposure to the environment.

The terms "curable" and "solidifiable" as used herein are interchangeable.

According to some embodiments of the present invention, a curable material as described herein hardens upon undergoing polymerization, and is also referred to herein as a polymerizable material.

The polymerization can be, for example, free-radical polymerization, cationic polymerization or anionic polymerization, and each can be induced when exposed to curing energy such as, for example, radiation, heat, etc., as described herein, or to a curing condition other than curing energy.

In some of any of the embodiments described herein, a curable material is a photopolymerizable material, which polymerizes and/or undergoes cross-linking upon exposure to radiation, as described herein, and in some embodiments the curable material is a UV-curable material, which polymerizes and/or undergoes cross-linking upon exposure to UV or UV-vis radiation, as described herein.

In some embodiments, a curable material as described herein is a photopolymerizable material that polymerizes via photo-induced free-radical polymerization. Alternatively, the curable material is a photopolymerizable material that polymerizes via photo-induced cationic polymerization.

In some of any of the embodiments described herein, a curable material can be a monomer, an oligomer or a short-chain polymer, each being polymerizable and/or cross-linkable as described herein.

In some of any of the embodiments described herein, when a curable material is exposed to a curing condition (e.g., radiation), it hardens (solidifies, cures) by any one, or combination, of chain elongation and cross-linking.

In some of any of the embodiments described herein, a curable material is a monomer or a mixture of monomers which can form a polymeric material upon a polymerization reaction, when exposed to a curing condition (e.g., curing energy) at which the polymerization reaction occurs. Such curable materials are also referred to herein as monomeric curable materials.

In some of any of the embodiments described herein, a curable material is an oligomer or a mixture of oligomers which can form a polymeric material upon a polymerization reaction, when exposed to a curing condition (e.g., curing energy) at which the polymerization reaction occurs. Such curable materials are also referred to herein as oligomeric curable materials.

In some of any of the embodiments described herein, a curable material, whether monomeric or oligomeric, can be a mono-functional curable material or a multi-functional curable material.

Herein, a mono-functional curable material comprises one functional group that can undergo polymerization when exposed to a curing condition such as curing energy (e.g., radiation).

A multi-functional curable material comprises two or more, e.g., 2, 3, 4 or more, functional groups that can undergo polymerization when exposed to curing energy. Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric or polymeric moiety, the multi-functional group is an oligomeric or polymeric multi-functional curable material. Multi-functional curable materials can undergo polymerization when subjected to curing energy and/or act as cross-linkers.

The final three-dimensional object is made of the modeling material formulation or a combination of modeling material formulations or modeling and support material formulations or modification thereof (e.g., following curing). All these operations are well-known to those skilled in the art of solid freeform fabrication.

In some exemplary embodiments of the invention an object is manufactured by dispensing two or more different building material formulations, each formulation from a different dispensing head of the AM. The building material formulations are optionally and preferably deposited in layers during the same pass of the printing heads. The formulations and combination of formulations within the layer are selected according to the desired properties of the object.

Herein throughout, the phrase "uncured building material" or "building material formulation" collectively describes the materials that are dispensed during the fabrication process so as to sequentially form the layers, as described herein. This phrase encompasses uncured materials (also referred to herein as building material formulation(s)) dispensed so as to form the printed object, namely, one or more uncured modeling material formulation(s), and uncured materials dispensed so as to form the support, namely uncured support material formulations.

The types of building material formulations can be categorized into two major categories: modeling material formulation and support material formulation. The support material formulation can serve as a supporting matrix or construction for supporting the object or object parts during the fabrication process and/or other purposes, e.g., providing hollow or porous objects. Support constructions may additionally include modeling material formulation elements, e.g. for further support strength. A building material formulation that provides a liquid or liquid-like material upon exposure to a curing condition can also be categorized, according to some embodiments of the present invention as a support material formulation.

Herein throughout, the phrases "cured modeling material" and "hardened modeling material" or simply "modeling material", which are used interchangeably, describe the part of the building material that forms a model object, as defined herein, upon exposing the dispensed building material to curing, and following removal of the support material. The cured or hardened modeling material can be a single hardened material or a mixture of two or more hardened materials, depending on the modeling material formulations used in the method, as described herein. A building material formulation that provides a liquid or liquid-like material upon exposure to a curing condition can also be categorized, according to some embodiments of the present invention as a modeling material formulation.

Herein throughout, the phrase "modeling material formulation", which is also referred to herein interchangeably as "modeling formulation", describes a part of the uncured building material which is dispensed so as to form the model object, as described herein. The modeling formulation is an uncured modeling formulation, which, upon exposure to a curing condition, forms the final object or a part thereof.

An uncured building material can comprise one or more modeling formulations, and can be dispensed such that different parts of the model object are made upon curing different modeling formulations, and hence are made of different cured modeling materials or different mixtures of cured modeling materials.

Herein throughout, the phrase "hardened support material" is also referred to herein interchangeably as "cured support material" or simply as "support material" and describes the part of the building material that is intended to support the fabricated final object during the fabrication process, and which is removed once the process is completed and a hardened modeling material is obtained.

Herein throughout, the phrase "support material formulation", which is also referred to herein interchangeably as "support formulation" or simply as "formulation", describes a part of the uncured building material which is dispensed so as to form the support material, as described herein. The support material formulation is an uncured formulation. When a support material formulation is a curable formulation, it forms, upon exposure to a curing condition, a hardened support material.

Support materials, which can be either liquid or liquid-like materials or hardened, typically gel or gel-like materials, are also referred to herein as sacrificial materials, which are removable after layers are dispensed and exposed to a curing energy, to thereby expose the shape of the final object.

Currently practiced support materials typically comprise a mixture of curable and non-curable materials, and are also referred to herein as gel-like support material or as gel support material.

Currently practiced support materials are typically water miscible, or water-dispersible or water-soluble.

Herein throughout, the term "water-miscible" describes a material which is at least partially dissolvable or dispersible in water, that is, at least 50% of the molecules move into the water upon mixture at room temperature. This term encompasses the terms "water-soluble" and "water dispersible".

Herein throughout, the term "water-soluble" describes a material that when mixed with water in equal volumes or weights, at room temperature, a homogeneous solution is formed.

Herein throughout, the term "water-dispersible" describes a material that forms a homogeneous dispersion when mixed with water in equal volumes or weights, at room temperature.

Herein throughout, the phrase "dissolution rate" describes a rate at which a substance is dissolved in a liquid medium. Dissolution rate can be determined, in the context of the present embodiments, by the time needed to dissolve a certain amount of a support material. The measured time is referred to herein as "dissolution time".

Herein throughout, whenever the phrase "weight percents" is indicated in the context of embodiments of a formulation (e.g., a building material formulation), it is meant weight percents of the total weight of the respective formulation.

The phrase "weight percents" is also referred to herein as "% by weight" or "% wt."

The Flowing Gel Formulation

According to an aspect of some embodiments of the present invention there is provided a formulation that is usable as a support material formulation in additive manufacturing of a three-dimensional object. According to some embodiments of the invention, the formulation provides, upon exposure to a curing condition, a material that features properties of a weak gel, as defined herein. According to some embodiments of the invention, the formulation provides, upon exposure to a curing condition, a material that features properties of a flowing or flowable gel, as defined herein. The formulation is also referred to herein as "flowing gel formulation" or "FG formulation" or "FLG formulation" or "formulation FG".

According to embodiments of the present invention, the formulation comprises: at least one monofunctional curable material; at least one multifunctional curable material; and at least one water-miscible non-curable material.

According to some of any of the embodiments described herein, the formulation is devoid of water.

In some of any of the embodiments described herein, the support material formulation is devoid of a silicon polyether.

By "devoid of" it is meant that an amount of the indicated material (e.g., water) is no more than 2%, or no more than 1%, or no more than 0.5%, or no more than 0.1%, or no more than 0.5%, or no more than 0.1%, or no more than 0.05%, or no more than 0.01%, by weight, and can be even less or null.

According to some of any of the embodiments described herein, a total amount of the curable materials is 20% or less, by weight, of the total weight of the formulation, and can be, for example, 20, 19, 18, 17, 16, 15, 14, 13, 12, 11, 10, % by weight, or less, of the total weight of the formulation.

According to some of any of the embodiments described herein, a weight ratio of a total weight of the monofunctional curable material(s) and a total weight of the multifunctional curable material(s) ranges from 1:1 to 10:1, including any intermediate values and subranges therebetween, and can be, for example, 1:1, or 1:2, or 1:3, or 1:4, or 1:5, or 1:6, or 1:7, or 1:9, or 1:9 or 1:10.

According to some of any of the embodiments described herein, a total amount of the one or more monofunctional curable material(s) ranges from 1 to 10, or from 3 to 10, or from 5 to 10, % by weight, of the total weight of the formulation, including any intermediate values and subranges therebetween.

According to some of any of the embodiments described herein, a total amount of the one or more multifunctional curable material(s) ranges from 1 to 5, % by weight, of the total weight of the formulation.

According to some of any of the embodiments described herein, one or more, or each, of the monofunctional curable material(s) is a hydrophilic material, as defined herein.

According to some of any of the embodiments described herein, one or more, or each, of the monofunctional curable material(s) is a water-miscible or water-soluble material, as defined herein.

Herein throughout, the term "hydrophilic" describes a physical property of a compound or a portion of a compound (e.g., a chemical group in a compound) which accounts for transient formation of bond(s) with water molecules, typically through hydrogen bonding.

A hydrophilic compound or portion of a compound (e.g., a chemical group in a compound) is one that is typically charge-polarized and capable of hydrogen bonding.

Hydrophilic compounds or groups typically include one or more electron-donating heteroatoms which form strong hydrogen bonds with water molecules. Such heteroatoms include, but are not limited to, oxygen and nitrogen. Preferably, a ratio of the number of carbon atoms to a number of heteroatoms in a hydrophilic compounds or groups is 10:1 or lower, and can be, for example, 8:1, more preferably 7:1, 6:1, 5:1 or 4:1, or lower. It is to be noted that hydrophilicity of compounds and groups may result also from a ratio between hydrophobic and hydrophilic moieties in the compound or chemical group, and does not depend solely on the above-indicated ratio.

Hydrophilic compounds dissolve more readily in water than in oil or other hydrophobic solvents. Hydrophilic compounds can be determined by, for example, as having LogP lower than 0.5, when LogP is determined in octanol and water phases, at a temperature lower than 50° C., or lower than 40° C., or lower than 35° C. or lower than 30° C., e.g., at 25° C.

Alternatively, hydrophilic compounds can be determined by, for example, the Hansen parameters, as having relative energy distance (RED) higher than 1, when calculated for interaction with water as a solvent, at a temperature lower than 50, or lower than 40° C., or lower than 35° C. or lower than 30° C., e.g., at 25° C.

A hydrophilic compound can have one or more hydrophilic groups that render the compound hydrophilic. Such groups are typically polar groups, comprising one or more electron-donating heteroatoms such as oxygen and nitrogen. The hydrophilic group can be, for example, one or more substituent(s) of a monomeric mono-functional curable material or two or more substituents or interrupting groups of an oligomeric mono-functional curable material. The hydrophilic group can be, for example, one or more substituent(s) of a monomeric multi-functional curable material or one or more substituents or interrupting groups of a linking moiety of a monomeric multi-functional curable moiety. The hydrophilic group can be, for example, two or more substituents or interrupting groups of an oligomeric linking moiety in oligomeric multi-functional curable material.

Exemplary hydrophilic groups include, but are not limited to, an electron-donating heteroatom, a carboxylate, a thiocarboxylate, oxo (=O), a linear amide, hydroxy, a (C1-4) alkoxy, an (C1-4)alcohol, a heteroalicyclic (e.g., having a ratio of carbon atoms to heteroatoms as defined herein), a cyclic carboxylate such as lactone, a cyclic amide such as lactam, a carbamate, a thiocarbamate, a cyanurate, an isocyanurate, a thiocyanurate, urea, thiourea, an alkylene glycol (e.g., ethylene glycol or propylene glycol), and a hydrophilic polymeric or oligomeric moiety, as these terms are defined hereinunder, and any combinations thereof (e.g., a hydrophilic group that comprises two or more of the indicated hydrophilic groups).

In some embodiments, the hydrophilic group is, or comprises, an electron donating heteroatom, a carboxylate, a heteroalicyclic, an alkylene glycol and/or a hydrophilic oligomeric moiety.

A hydrophilic polymeric or oligomeric moiety, as used herein, comprises a polymeric chain which comprises hydrophilic groups as defined herein. The hydrophilic groups can be heteroatoms within the backbone chain of the polymeric moiety, as, for example, in poly(alkylene glycols) or hydrophilic pendant groups. A polymeric or oligomeric moiety, according to some embodiments of the present invention, preferably has from 10 to 40 repeating backbone units, more preferably from 10 to 20 repeating backbone units.

A hydrophilic mono-functional curable material according to some embodiments of the present invention can be a vinyl-containing compound represented by Formula I:

Formula I

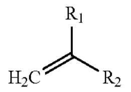

wherein at least one of $R_1$ and $R_2$ is and/or comprises a hydrophilic group, as defined herein.

The (=$CH_2$) group in Formula I represents a polymerizable group, and is typically a UV-curable group, such that the material is a UV-curable material.

For example, $R_1$ is a hydrophilic group as defined herein and $R_2$ is a non-hydrophilic group, for example, hydrogen, C(1-4) alkyl, C(1-4) alkoxy, or any other substituent, as long as the compound is hydrophilic, as defined herein.

In some embodiments, $R_1$ is a carboxylate, —C(=O)—OR' group, and $R_2$ is hydrogen, and the compound is a mono-functional acrylate monomer. In some of these embodiments, $R_2$ is methyl, and the compound is mono-functional methacrylate monomer. In other embodiments, $R_2$ is a hydrophilic substituent, namely, a substituent which is, or which comprises, a hydrophilic group as described herein.

In some of any of these embodiments, the carboxylate group, —C(=O)—OR', comprises R' which is a hydrophilic group. Exemplary R' groups include, but are not limited to, heteroalicyclic groups (having a ratio of 5:1 or lower of carbon atoms to electron-donating heteroatoms, such as morpholine, tetrahydrofurane, oxalidine, and the likes), hydroxyl, C(1-4)alkoxy, thiol, alkylene glycol or a polymeric or oligomeric moiety, as described herein. An exemplary monomeric mono-functional acrylate is acryloyl morpholine (ACMO).

In some embodiments, $R_1$ is amide, and in some embodiments, it is a cyclic amide such as lactam, and the compound is a vinyl lactam. In some embodiments, $R_1$ is a cyclic carboxylate such as lactone, and the compound is a vinyl lactone.

When one or both of $R_1$ and $R_2$ comprise a polymeric or oligomeric moiety, for example, a hydrophilic oligomeric moiety, as defined herein, the mono-functional curable compound of Formula I is an exemplary oligomeric mono-functional curable material. Otherwise, it is an exemplary monomeric mono-functional curable material.

Exemplary oligomeric mono-functional curable materials include, but are not limited to, a mono-(meth)acrylated urethane oligomer derivative of polyethylene glycol, a mono-(meth)acrylated polyol oligomer, a mono-(meth)acrylated oligomer having hydrophilic substituents, and a mono-(meth)acrylated polyethylene glycol (e.g., methoxypolyethylene glycol). (Meth)acrylated means that the oligomer or polymer comprises an acrylate or methacrylate functional group.

In some embodiments, $R_1$ is a carboxylate and R' is a poly(alkylene glycol), as defined herein. An exemplary such hydrophilic monofunctional curable material is hexa(ethylene glycol) acrylate, (6-PEA).

In some embodiments, $R_1$ is a hydrophilic heteroalicyclic group, as defined herein. An exemplary such hydrophilic monofunctional curable material is ACMO.

In some embodiments, in case there are two or more monofunctional curable materials, all of the monofunctional curable materials are hydrophilic and/or water-soluble or water-miscible materials, and in some embodiments, only one of these materials is a hydrophilic and/or water-soluble or water-miscible material.

In some embodiments, one or more of the monofunctional curable materials provides, when hardened per se, a material that is water-soluble. An exemplary such material is ACMO.

In some embodiments, each of the monofunctional curable materials provides, when hardened per se, a material that is water-soluble.

In some embodiments, one or more of the monofunctional curable materials provides, when hardened per se, a material that is water-insoluble. Exemplary such materials include PEA6 and HEAA.

In some embodiments, each of the monofunctional curable materials provides, when hardened per se, a material that is water-insoluble.

In some embodiments, one or more of the monofunctional curable materials provides, when hardened per se, a material that is water-soluble, and one or more of the monofunctional curable materials provides, when hardened per se, a material that is water-insoluble.

In some of any of the embodiments described herein, at least one of the monofunctional curable material(s) is a curable material that comprises a hydroxyalkyl (e.g., HEAA) and/or an alkylene glycol moiety (e.g., a poly (alkylene glycol acrylate such as, for example, PEA6).

According to some of any of the embodiments described herein, each of the one or more multifunctional curable materials is a hydrophilic material.

A hydrophilic multi-functional curable material according to some embodiments of the present invention can be represented by Formula II:

Formula II

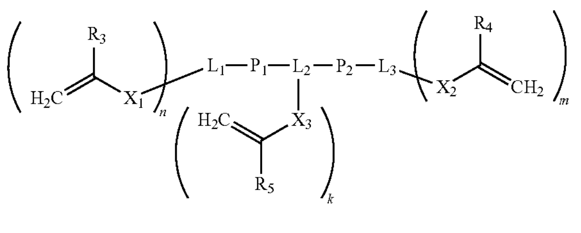

wherein:

each of $R_3$, $R_4$ and $R_5$ is independently hydrogen, C(1-4) alkyl, or a hydrophilic group, as defined herein;

each of $L_1$, $L_2$ and $L_3$ is independently a linking moiety or absent;

each of $P_1$ and $P_2$ is independently a hydrophilic group as defined herein or absent;

each of $X_1$, $X_2$ and $X_3$ is independently C(1-4)alkyl, or a hydrophilic group, as defined herein, or absent; and each of n, m and k is 0, 1, 2, 3 or 4, provided that n+m+k is at least 2, and provided that at least one of $R_3$, $R_4$, $R_5$, $X_1$, $X_2$, $X_3$ $P_1$ and $P_2$ is a hydrophilic group, as defined herein.

Multi-functional curable materials of Formula II in which one, two or all of $X_1$, $X_2$ and $X_3$, when present, is oxo, are multi-functional acrylates, which can be further substituted by a hydrophilic group, as described hereinabove. When one or more of $R_3$, $R_4$ and $R_5$, when present, is methyl, the curable materials are multi-functional methacrylates.

Multifunctional curable materials in which one, two or all of $X_1$, $X_2$ and $X_3$, when present, is oxo, can include a combination of acrylate and methacrylate functional moieties.

In some embodiments, the acrylate or methacrylate multifunctional curable material is monomeric, such that none of $P_1$ and $P_2$ is a polymeric or oligomeric moiety. In some of these embodiments, one or both of $P_1$ and $P_2$ is a hydrophilic group as described herein, for example, an alkylene glycol, or any other hydrophilic linking group, or a short chain (e.g., of 1-6 carbon atoms), substituted or unsubstituted hydrocarbon moiety, as defined herein.

In some embodiments, one or both of $P_1$ and $P_2$ is a polymeric or oligomeric moiety as defined herein, and the curable compound is an oligomeric multi-functional curable material, for example, an oligomeric multi-functional acrylate or methacrylate, as described herein for $X_1$, $X_2$ and/or $X_3$. If both $P_1$ and $P_2$ are present, $L_2$ can be, for example, a linking moiety such as a hydrocarbon, comprising alkyl, cycloalkyl, aryl and any combination thereof. Exemplary such curable materials include ethoxylated or methoxylated polyethylene glycol diacrylate, and ethoxylated bisphenol A diacrylate.

Other non-limiting examples include polyethylene glycol diacrylate, polyethylene glycol dimethacrylate, polyethylene glycol-polyethylene glycol urethane diacrylate, and a partially acrylated polyol oligomer.

In some embodiments, one or more of $P_1$ and $P_2$ is, or comprises, a poly(alkylene glycol) moiety, as defined herein.

In some of any of the embodiments of an acrylate or methacrylate multifunctional curable material of Formula II, one or more of $R_3$, $R_4$ and $R_5$ is a hydrophilic group as described, for example, for $R_1$ and $R_2$ in Formula I, herein. In these embodiments, $P_1$ and/or $P_2$ can be present or absent, and can be, or comprise, a hydrophilic group or not, as long as the material is hydrophilic, as defined herein.

Alternatively, one, two or all of $X_1$, $X_2$ and $X_3$, when present, can be —O—, such that at least one functional moiety in the multi-functional curable material is vinyl ether.

In some embodiments, n and m are each 1, k is 0, $X_1$ is O, $X_2$ is absent, and the compound is a vinyl ether, which can be substituted or not. In some of these embodiments, $L_1$, $L_2$, $L_3$, $P_1$ and $P_2$ are absent, and the compound is a monomeric vinyl ether. Examples of monomeric vinyl ethers include ethyl vinyl ether, propyl vinyl ether, isobutyl vinyl ether, cyclohexyl vinyl ether, 2-ethylhexyl vinyl ether, butyl vinyl ether, ethyleneglycol monovinyl ether, diethyleneglycol divinyl ether, butane diol divinyl ether, hexane diol divinyl ether, cyclohexane dimethanol monovinyl ether and the like.

In some embodiments, $P_1$ and $P_2$ are absent, and one of $L_1$ and $L_2$ is an alkylene chain substituted by one or more hydrophilic groups. An exemplary such curable compound is 1,4-cyclohexane dimethanol divinyl ether.

In some embodiments, one or more of $P_1$ and $P_2$ is a hydrophilic polymeric or oligomeric moiety, as defined herein. In some embodiments, one or more of $P_1$ and $P_2$ is, or comprises, a poly(alkylene glycol) moiety, as defined herein. In some embodiments the polymeric moiety is substituted by one or more vinyl ether substituents.

In some of any of the embodiments related to Formula II, one or more of the substituents of the polymerizable group, $R_3$, $R_4$ and $R_5$, can be a hydrophilic group as described for $R_1$ and $R_2$ in Formula I herein.

In some of any of the embodiments related to Formula II, when $P_1$ and $P_2$ is a polymeric or oligomeric moiety, this moiety can comprise hydrophilic heteroatoms as defined herein, within the backbone chain or the backbone chain can be substituted by hydrophilic groups, as described herein.

In some of any of the embodiments described herein, one or more, or each of the multifunctional curable materials is a hydrophilic material as defined herein.

In some of any of the embodiments described herein, one or more, or each of the multifunctional curable materials is a water-soluble or water-miscible material as defined herein.

In some of any of the embodiments described herein, one or more, or each of the multifunctional curable materials provides, when hardened, a material that is water-insoluble.

In some of any of the embodiments described herein, one or more, or each, of the multifunctional curable material(s) comprises one or more alkylene glycol moieties. In some of these embodiments, a multifunctional curable material comprises a poly(alkylene glycol) moiety.

In some of any of the embodiments described herein, one or more, or each, of the multifunctional curable material(s) is a di-functional material.

In some of any of the embodiments described herein, the multifunctional curable material(s) comprise or is a poly (alkylene glycol)diacrylate. The poly(alkylene glycol)diacrylate can be of from 20 to 1000 alkylene glycol units, including any intermediate values and subranges therebetween.

In an exemplary embodiment, the multifunctional curable material(s) comprises or is a poly(ethylene glycol)diacrylate, of from 20 to 1000, or from 100 to 1000, or from 200 to 1000, or from 100 to 800, or from 200 to 800, or from 400 to 800, ethylene glycol units, including any intermediate values and subranges therebetween.

The formulation as described herein further comprises non-curable materials. In some embodiments, a total amount of the non-curable materials is at least 70%, or at least 75 5, or at least 80%, or at least 85%, by weight, of the total weight of the formulation.

The term "non-curable" encompasses materials that are non-polymerizable under any conditions or materials that are non-curable under conditions at which the mono-functional and multifunctional curable materials as described herein are curable, or under any condition used in a fabrication of an object according to the present embodiments. Such materials are typically devoid of a polymerizable group or of a UV-photopolymerizable group. In some embodiments, the material is non-reactive towards the curable material as described herein, that is, it does not react with the curable material and is incapable of interfering with the curing of the curable materials, under the fabrication conditions, including the curing conditions.

In some of any of the embodiments described herein the non-curable material is water soluble or water dispersible or water miscible material, as defined herein.

In some of any of the embodiments described herein, one or more, or each, of the non-curable material(s) is a water-miscible or water-soluble material.

In some of any of the embodiments described herein, one or more of the non-curable materials is a polymeric material, for example, a water-miscible or water-soluble polymeric material.

In some embodiments, the non-curable material is a polymeric material which comprises a plurality of hydrophilic groups as defined herein, either within the backbone chain of the polymer or as pendant groups. Exemplary such polymeric materials are polyols. Some representative examples include, but are not limited to, Polyol 3165, polypropylene glycol, polyethylene glycol, polyglycerol, polyglyme, ethoxylated forms of these polymers, paraffin oil and the like, and any combination thereof.

In exemplary embodiments, the non-curable polymeric material comprises poly(ethylene glycol) and/or polyol 3165. The polymeric materials can be of any molecular weight.

In some embodiments, the one or more polymeric materials and an amount thereof are selected such that the formulation features a viscosity that is suitable for the additive manufacturing method, as described herein.

In some of any of the embodiments described herein, a polymeric material has a MW of at least 500, or at least 600 grams/mol.

In some of any of the embodiments described herein, a polymeric material has a MW of no more than 3000, or nor more than 2500, or no more than 2000 or no more than 1500, grams/mol.

In some of any of the embodiments described herein, a polymeric material has a MW of from about 500 to about 2500 grams/mol, including any intermediate value and subranges therebetween.

In some of any of the embodiments described herein, the one or more non-curable material(s) comprise a non-polymeric material, for example, a water-soluble or water-miscible non-polymeric material.

Exemplary such non-curable, non-polymeric material, include, but are not limited to, propane diol (e.g., 1,2-propandoil, also referred to herein and in the art as propylene glycol), propane triol, glycerol, butyl diglyme (Butyl Di Glycol Acetate, Diethylene glycol butyl ether acetate,2-(2-Butoxyethoxy)ethyl acetate), Diethylene glycol monobutyl ether (BDG), (EDGAc) Diethylene glycol monoethyl ether acetate (EDGAc; DGMEA), Di(ethylene glycol) ethyl ether (DEGEE), Tri(propyleneglycol)methyl ether, Dipropylene glycol monomethyl ether (DPGME), Di(propylene glycol) methyl ether acetate (DPGMEA), propylene carbonate (1,2-Propanediol cyclic carbonate, 4-Methyl-1,3-dioxolan-2-one), Diethylene glycol methyl ether (DGME), Diethylene glycol methyl ether (TGMME), 1-Methoxy-2-propanol (PGME/PM; Propyleneglycol monomethyl ether), and Propylene glycol monomethyl ether acetate (PGMEA).

In some of any of the embodiments described herein, the formulation comprises a water-miscible, non-curable material which comprises a mixture of two or more of the polymeric and non-polymeric water-miscible, non-curable materials described herein. An exemplary such a mixture may comprise two or more of a poly(ethylene glycol), a propane diol, glycerol and a polyol such as Polyol 3165.

In some of these embodiments, a weight ratio of a total weight of the one or more polymeric non-curable material(s) and a total weight of the one or more non-polymeric non-curable material(s) ranges from 2:1 to 1:2, including any intermediate values and subranges therebetween.

An exemplary, non-limiting, formulation according to the present embodiments comprises:

One or more monofunctional curable material(s), as described herein in any of the respective embodiments, in an amount of from 3 to 10, % by weight;

One or more hydrophilic multifunctional (e.g., di-functional) curable material(s), as described herein in any of the respective embodiments, in an amount of from 3 to 5, % by weight;

One or more polymeric non-curable material(s), as described herein in any of the respective embodiments, in an amount of from 30 to 60, % by weight; and One or more non-polymeric non-curable material(s), as described herein in any of the respective embodiments, in an amount of from 30 to 60, % by weight, and a total amount of the non-curable materials is at least 80% by weight of the total weight of the formulation.

In some of any of the embodiments described herein, the formulation is usable in additive manufacturing such as 3D inkjet printing.

In some of any of the embodiments described herein, the formulation features properties (e.g., viscosity, surface tension, jettability) that are suitable for additive manufacturing such as 3D inkjet printing, as described herein.

In some embodiments, the formulation features a viscosity of from 8 to 40, or from 8 to 30, or from 8 to 25, centipoises at the jetting temperature (e.g., at 75° C.).

In some of any of the embodiments described herein, and as discussed hereinabove, the formulation provides, when hardened, a material that features properties of weak gel.

In some of any of the embodiments described herein, and as discussed hereinabove, the formulation provides, when hardened, a material that features an elastic modulus (e.g., Young's modulus) of from 10 to 100, or from 10 to 80, or from 20 to 80, or from 10 to 50, or from 20 to 50, or from 10 to 70, or from 20 to 70, or from 30 to 80, or from 30 to 70, or from 30 to 100, or from 20 to 90, or from 10 to 90, or from 30 to 90, or from 40 to 90, or from 40 to 100, or from 40 to 80, or from 40 to 70, or from 20 to 60, or from 10 to 60, or from 30 to 60, or from 40 to 60, or from 50 to 100, or from 50 to 90, or from 50 to 80, or from 50 to 70, or from 50 to 60, kPa, including any intermediate values and subranges therebetween.

According to some of any of the embodiments described herein, the formulation provides, when hardened, a gel material that is flowable upon application of positive pressure, as described herein.

According to some of these embodiments, the positive pressure is such that is applied by pressing the formulation by a human being.

In some of any of the embodiments described herein, one or more, and preferably each, of the monofunctional and multifunctional curable materials is a UV-curable material.

In some of any of the embodiments described herein, one or more, and preferably each, of the monofunctional and multifunctional curable materials is an acrylic material, as defined herein.

In some of any of the embodiments described herein, the formulation further comprises one or more photoinitiator(s).

In some of these embodiments, a total amount of the photoinitiator is no more than 2% by weight of the total weight of the formulation, and can be, for example, in a range of from 0.1 to 2%, or from 0.1 to 1.5%, or from 0.5 to 1.5%, by weight, including any intermediate values and subranges therebetween.

The photoinitiator can be a free radical photo-initiator, a cationic photo-initiator, or any combination thereof.

A free radical photoinitiator may be any compound that produces a free radical upon exposure to radiation such as ultraviolet or visible radiation and thereby initiates a polymerization reaction. Non-limiting examples of suitable photoinitiators include phenyl ketones, such as alkyl/cycloalkyl phenyl ketones, benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and benzoin alkyl ethers such as benzoin, benzoin methyl ether and benzoin isopropyl ether and the like. Examples of photoinitiators are alpha-amino ketone, and 1-hydroxycyclohexyl phenyl ketone (e.g., marketed as Irgacure® 184).

A free-radical photo-initiator may be used alone or in combination with a co-initiator. Co-initiators are used with initiators that need a second molecule to produce a radical that is active in the UV-systems. Benzophenone is an example of a photoinitiator that requires a second molecule, such as an amine, to produce a curable radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine.

Suitable cationic photoinitiators include, for example, compounds which form aprotic acids or Bronsted acids upon exposure to ultraviolet and/or visible light sufficient to initiate polymerization. The photoinitiator used may be a single compound, a mixture of two or more active compounds, or a combination of two or more different compounds, i.e. co-initiators. Non-limiting examples of suitable cationic photoinitiators include aryldiazonium salts, diaryliodonium salts, triarylsulphonium salts, triarylselenonium salts and the like. An exemplary cationic photoinitiator is a mixture of triarylsolfonium hexafluoroantimonate salts.

In some of any of the embodiments described herein, the formulation may further comprise one or more additional agents that are beneficially used in the fabrication process. Such agents include, for example, surface active agents, inhibitors and stabilizers.

In some embodiments, a support material formulation as described herein comprises a surface active agent. A surface-active agent may be used to reduce the surface tension of the formulation to the value required for jetting or for other printing process, which is typically around 30 dyne/cm. An exemplary such agent is a silicone surface additive such as, but not limited to, surface active agents marketed as the BYK family.

In some embodiments, a support material formulation as described herein further comprises an inhibitor, which inhibits pre-polymerization of the curable material during the fabrication process and before it is subjected to curing conditions. An exemplary stabilizer (inhibitor) is Tris(N-nitroso-N-phenylhydroxylamine) Aluminum Salt (NPAL) (e.g., as marketed under FirstCure®NPAL).

Suitable stabilizers include, for example, thermal stabilizers, which stabilize the formulation at high temperatures.

Model Fabrication

According to an aspect of some embodiments of the present invention there is provided a method of fabricating a three-dimensional model object, which utilizes a formulation as described herein as support material formulation. The method is also referred to herein as a fabrication process or as a model fabrication process. In some embodiments, the method comprises dispensing an uncured building material so as to sequentially form a plurality of layers in a configured pattern corresponding to the shape of the object. In some embodiments, the (uncured) building material comprises one or more modeling material formulation(s) and one or more support material formulation(s), and one or more of the support material formulations is a formulation as described herein in any of the respective embodiments.

The modeling material formulation can be any modeling material formulation usable in additive manufacturing such as 3D inkjet printing, and is preferably curable under the same conditions at which the support material formulation is curable.

According to some embodiments of the present invention, the fabrication method is additive manufacturing of a three-dimensional model object.

According to some embodiments of this aspect, formation of each layer is effected by dispensing at least one uncured building material, and exposing the dispensed building material to curing energy or curing conditions, to thereby form a cured building material, which is comprised of a cured modeling material and a cured support material.

According to some of any of the embodiments described herein, the additive manufacturing is preferably by three-dimensional inkjet printing.

The method of the present embodiments manufactures three-dimensional objects in a layerwise manner by forming a plurality of layers in a configured pattern corresponding to the shape of the objects.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material (e.g., a modeling material formulation or a support material formulation) is to be delivered thereto. The decision is made according to a computer image of the surface.

When the AM is by three-dimensional printing, an uncured building material, as defined herein, is dispensed from a dispensing head having a set of nozzles to deposit building material in layers on a supporting structure. The AM apparatus thus dispenses building material in target locations which are to be occupied and leaves other target locations void. The apparatus typically includes a plurality of dispensing heads, each of which can be configured to dispense a different building material. Thus, different target locations can be occupied by different building materials (e.g., a modeling formulation and/or a support formulation, as defined herein).

Figure 1A:
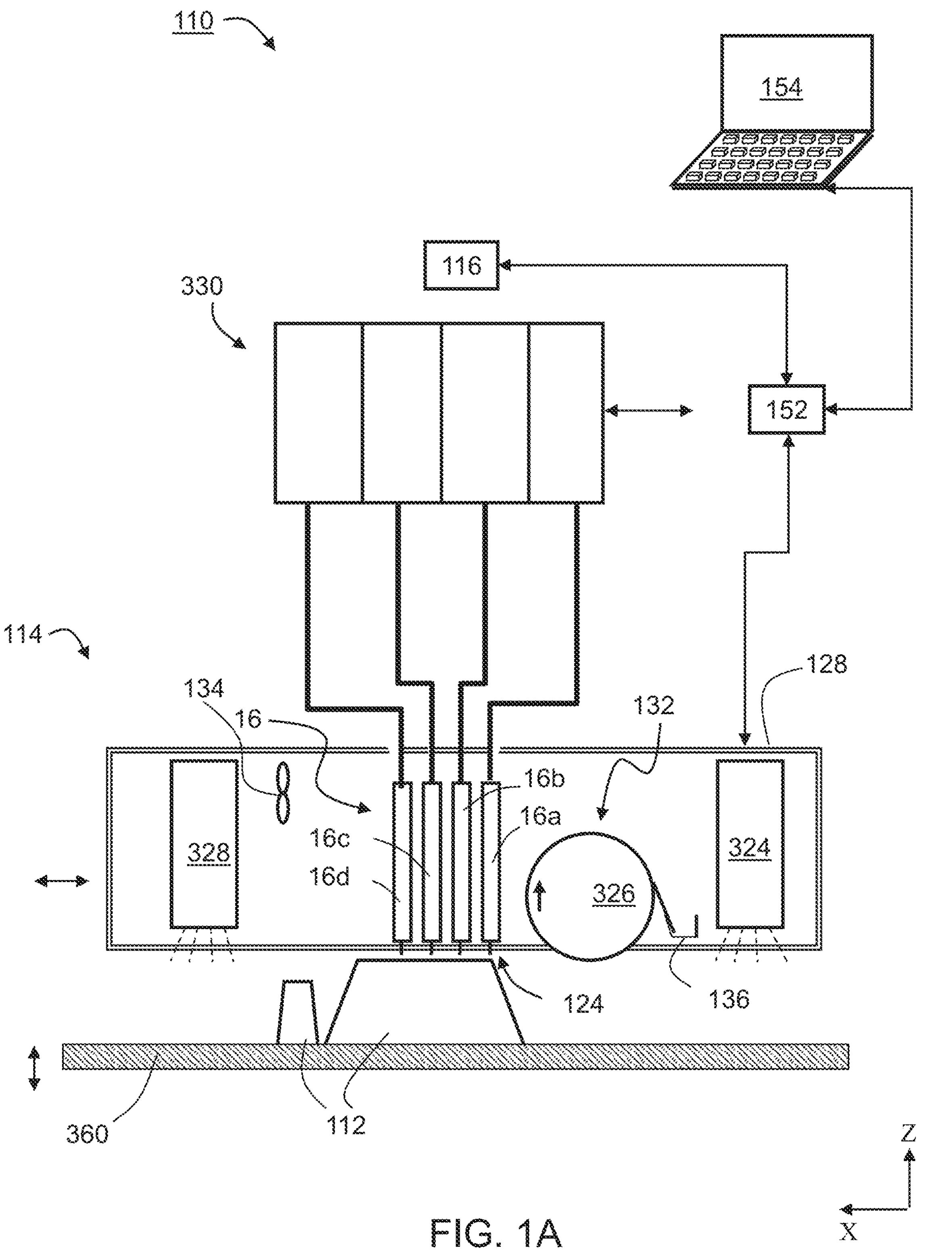
FIGS. 1A-1D are schematic illustrations of an additive manufacturing system according to some embodiments of the invention.
Figure 2A:
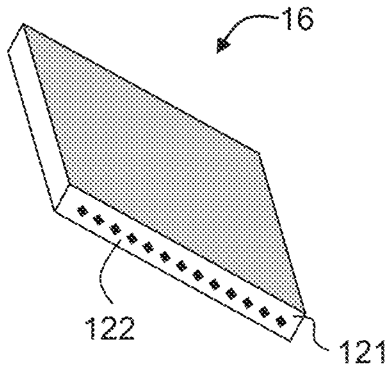
FIGS. 2A-2C are schematic illustrations of printing heads according to some embodiments of the present invention.
Figure 2B:
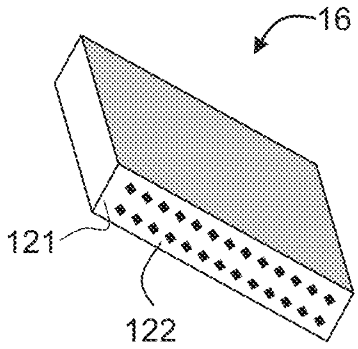
Figure 2C:
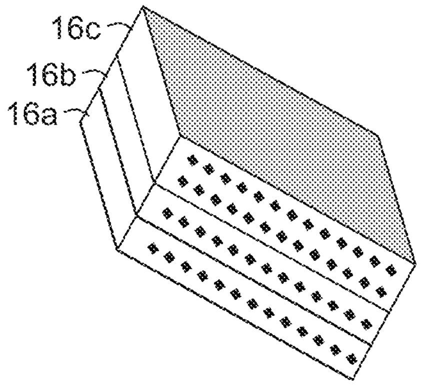

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises one or more arrays of nozzles 122, as illustrated in FIGS. 2A-2C described below, through which a liquid building material 124 is dispensed.

According to some embodiments of the present invention, apparatus 114 operates at a temperature that does not exceed 35° C.

Preferably, but not obligatorily, apparatus 114 is a three-dimensional inkjet printing apparatus, in which case the dispensing heads are printing heads, and the building material is dispensed via inkjet technology from a printing head having one or more arrays of nozzles to deposit building material formulation in layers on a supporting structure. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

The term "printing head" as used herein represents a dispensing head usable in 3D printing such as 3D inkjet printing.

The term "dispensing head" encompasses the term "printing head" in the context of embodiments relating to 3D inkjet printing.

Each dispensing head is optionally and preferably fed via one or more building material formulation reservoirs which may optionally include a temperature control unit (e.g., a temperature sensor and/or a heating device), and a material formulation level sensor. To dispense a building material formulation, a voltage signal is applied to the dispensing heads to selectively deposit droplets of a selected formulation or a selected combination of two or more formulations via the dispensing head nozzles, for example, as in piezoelectric inkjet printing technology. Another example includes thermal inkjet printing heads. In these types of heads, there are heater elements in thermal contact with the building material formulation, for heating the building material formulation to form gas bubbles therein, upon activation of the heater elements by a voltage signal. The gas bubbles generate pressures in the building material formulation, causing droplets of building material formulation to be ejected through the nozzles. Piezoelectric and thermal printing heads are known to those skilled in the art of solid freeform fabrication. For any types of inkjet dispensing heads, the dispensing rate of the head depends on the number of nozzles, the type of nozzles and the applied voltage signal rate (frequency).

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 1A, four dispensing heads 16*a*, 16*b*, 16*c* and 16*d* are illustrated. Each of heads 16*a*, 16*b*, 16*c* and 16*d* has a nozzle array. In this Example, heads 16*a* and 16*b* can be designated for modeling material/s and heads 16*c* and 16*d* can be designated for support material. Thus, head 16*a* can dispense a first modeling material, head 16*b* can dispense a second modeling material and heads 16*c* and 16*d* can both dispense support material. In an alternative embodiment, heads 16*c* and 16*d*, for example, may be combined in a single head having two nozzle arrays for depositing support material. In a further alternative embodiment any one or more of the printing heads may have more than one nozzle arrays for depositing more than one material formulation, e.g. two nozzle arrays for depositing two different modeling material formulations or a modeling material formulation and a support material formulation, each formulation via a different array or number of nozzles.

Yet it is to be understood that it is not intended to limit the scope of the present invention and that the number of modeling material printing heads (modeling heads) and the number of support material printing heads (support heads) may differ. Generally, the number of arrays of nozzles that dispense modeling material formulation, the number of arrays of nozzles that dispense support material formulation, and the number of nozzles in each respective array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material equals the height of support material. Typical values for a are from about 0.6 to about 1.5.

For example, for a=1, the overall dispensing rate of support material is generally the same as the overall dispensing rate of the modeling material when all the arrays of nozzles operate.

For example, apparatus 114 can comprise M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

In some embodiments, the temperature control unit of at least a few of the arrays is configured so as not to exceed 45° C., or 40° C., or 35° C.

Apparatus 114 can further comprise a hardening device 324 which can include any device configured to emit light, heat or the like that may cause the deposited material to harden. For example, hardening device 324 can comprise one or more radiation sources, which can be, for example, an ultraviolet or visible or infrared lamp, or other sources of electromagnetic radiation, or electron beam source, depending on the modeling material being used. In some embodiments of the present invention, hardening device 324 serves for curing or solidifying the modeling material.

As used herein, the term "dispensing head" or "depositing head" encompass printing heads which are dispensing heads usable in 3D printing such as 3D inkjet printing.

The dispensing head(s) and radiation source are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the materials just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material generated during leveling. Waste collection device 136 may comprise any mechanism that delivers the material to a waste tank or waste cartridge.

In use, the dispensing heads of unit 16 move in a scanning direction, which is referred to herein as the X direction, and selectively dispense building material in a predetermined configuration in the course of their passage over tray 360. The building material typically comprises one or more types of support material and one or more types of modeling material. The passage of the dispensing heads of unit 16 is followed by the curing of the modeling material(s) by radiation source 126. In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material supply system 330 which comprises the building material containers or cartridges and supplies a plurality of building materials to fabrication apparatus 114.

A control unit 152 controls fabrication (e.g., printing) apparatus 114 and optionally and preferably also supply system 330. Control unit 152 typically includes an electronic circuit configured to perform the controlling operations. Control unit 152 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 152 controls the voltage applied to each dispensing head or nozzle array and the temperature of the building material in the respective printing head or respective nozzle array, as described herein.

According to some embodiments of the present invention, control unit 152 is operated such that the temperature of the building material (uncured) does not exceed 40° C. or 35° C.

Once the manufacturing data is loaded to control unit 152 it can operate without user intervention. In some embodiments, control unit 152 receives additional input from the operator, e.g., using data processor 154 or using a user interface 116 communicating with unit 152. User interface 116 can be of any type known in the art, such as, but not limited to, a keyboard, a touch screen and the like. For example, control unit 152 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 1B:
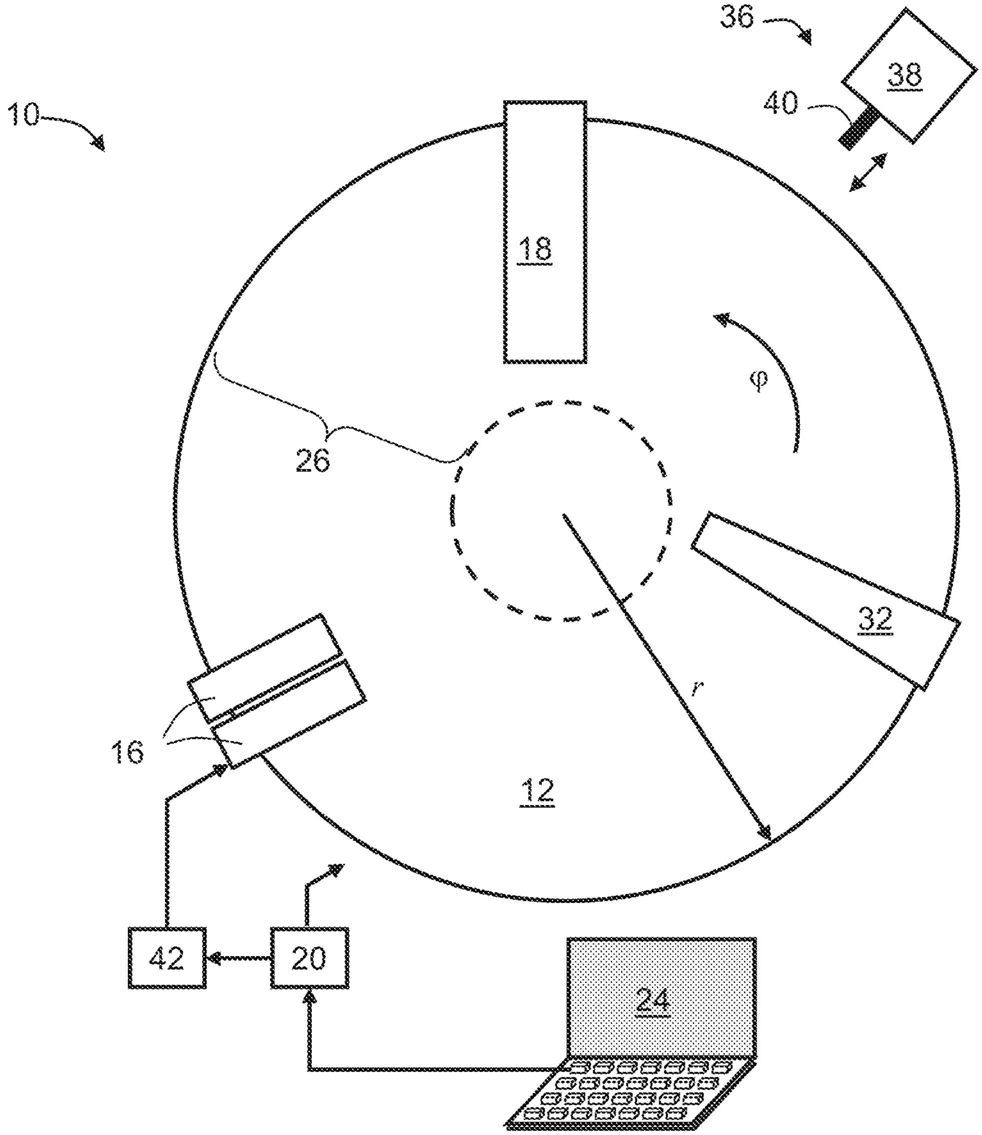
Figure 1C:
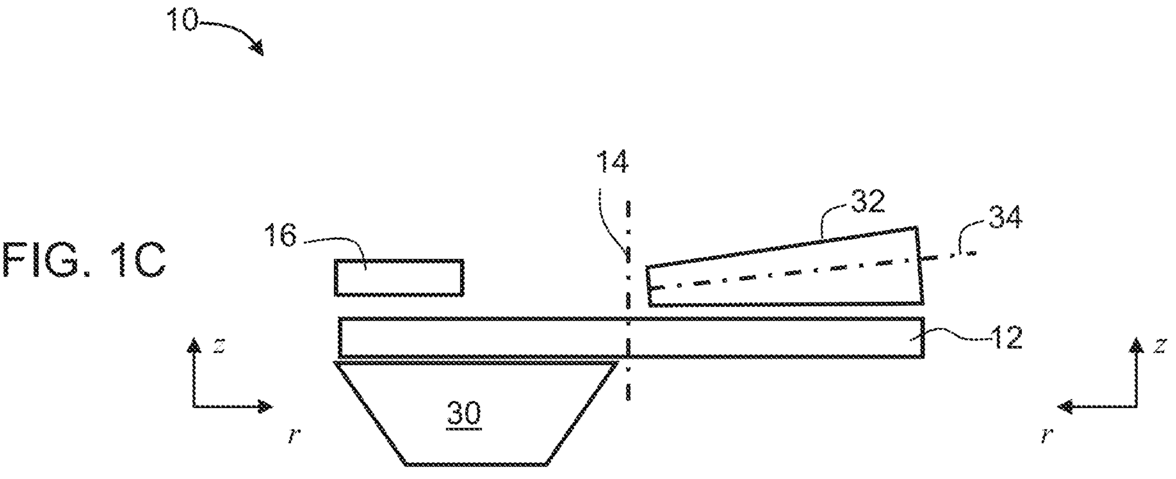
Figure 1D:
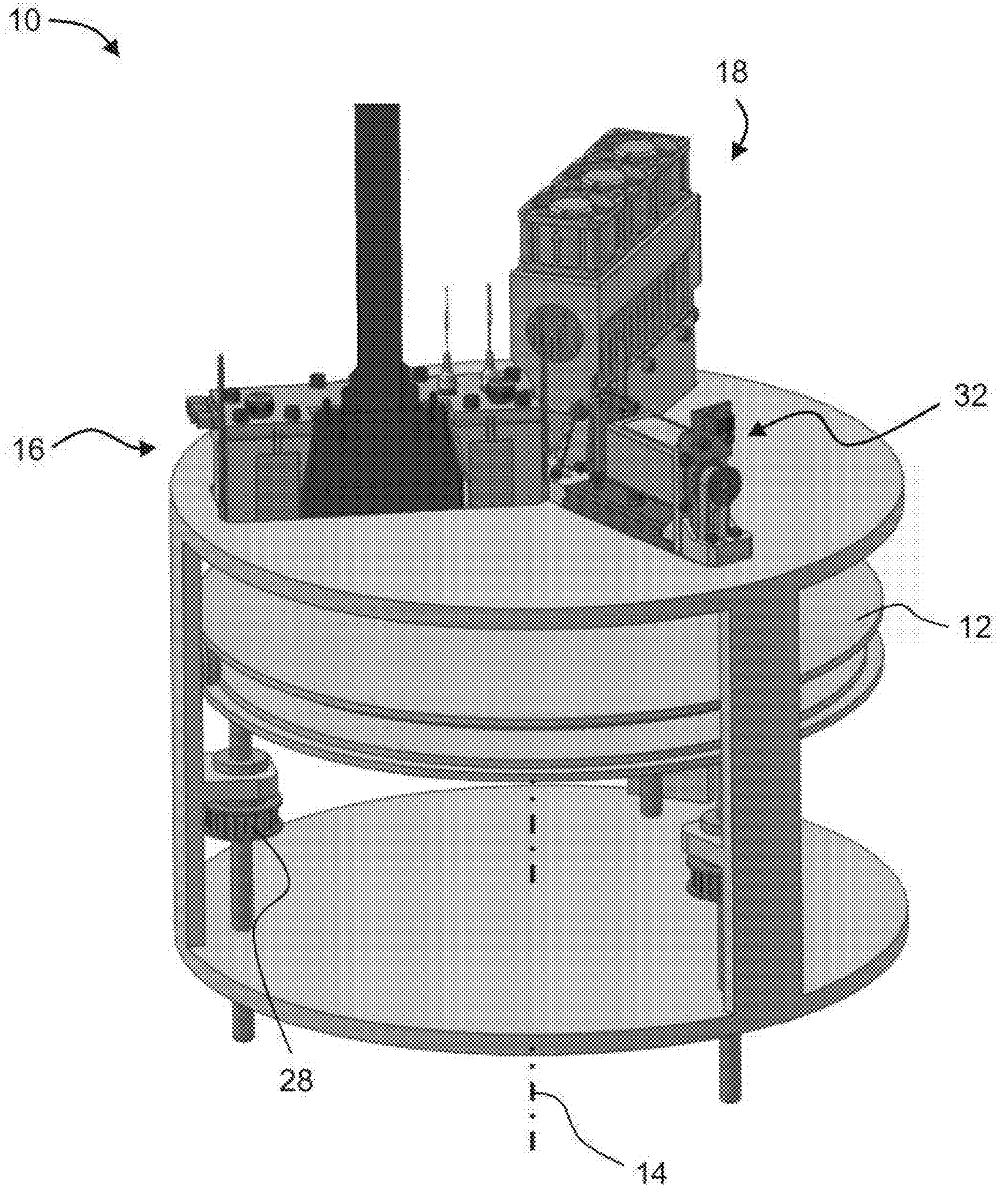

Another representative and non-limiting example of a system 10 suitable for AM of an object according to some embodiments of the present invention is illustrated in FIGS. 1B-1D. FIGS. 1B-1D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having each having one or more arrays of nozzles with respective one or more pluralities of separated nozzles. Tray 12 can have a shape of a disk or it can be annular. Non-round shapes are also contemplated, provided they can be rotated about a vertical axis. Printing heads 16 can be any of the printing heads described above with respect to system 110.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The radial direction r in system 10 enacts the indexing direction y in system 110, and the azimuthal direction φ enacts the scanning direction x in system 110. Therefore, the radial direction is interchangeable referred to herein as the indexing direction, and the azimuthal direction is interchangeable referred to herein as the scanning direction.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-2B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16*a*, 16*b*, 16*c* is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
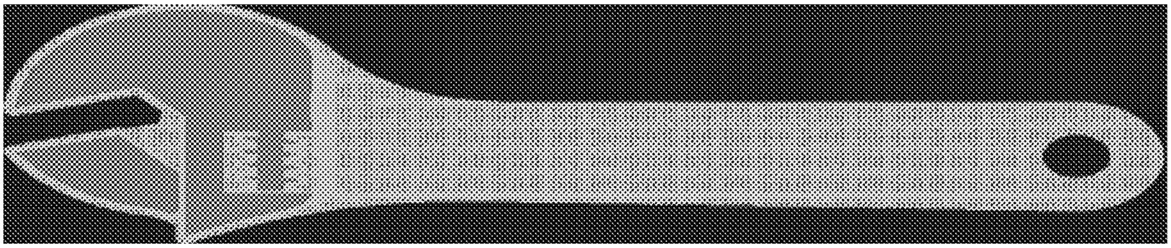
FIGS. 3A and 3B are schematic illustrations demonstrating coordinate transformations according to some embodiments of the present invention.
Figure 3B:
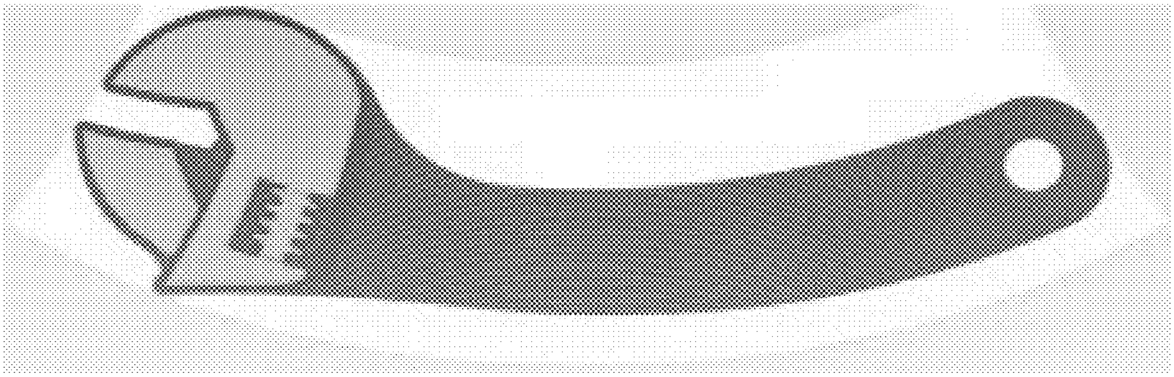

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material at different radial positions. Representative examples of coordinate transformations according to some embodiments of the present invention are provided in FIGS. 3A-3B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. Radiation source 18 serves for curing or solidifying the modeling material. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 2C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different materials from different arrays of nozzles (belonging to the same or different printing head). These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

Further details on the principles and operations of an AM system suitable for the present embodiments are found in U.S. Pat. No. 9,031,680, and International Publication No. WO2016/009426, the contents of which are hereby incorporated by reference.

The present embodiments thus enable the deposition of a broad range of material combinations, and the fabrication of an object which may consist of multiple different combinations of materials, in different parts of the object, according to the properties desired to characterize each part of the object.

Figure 4:
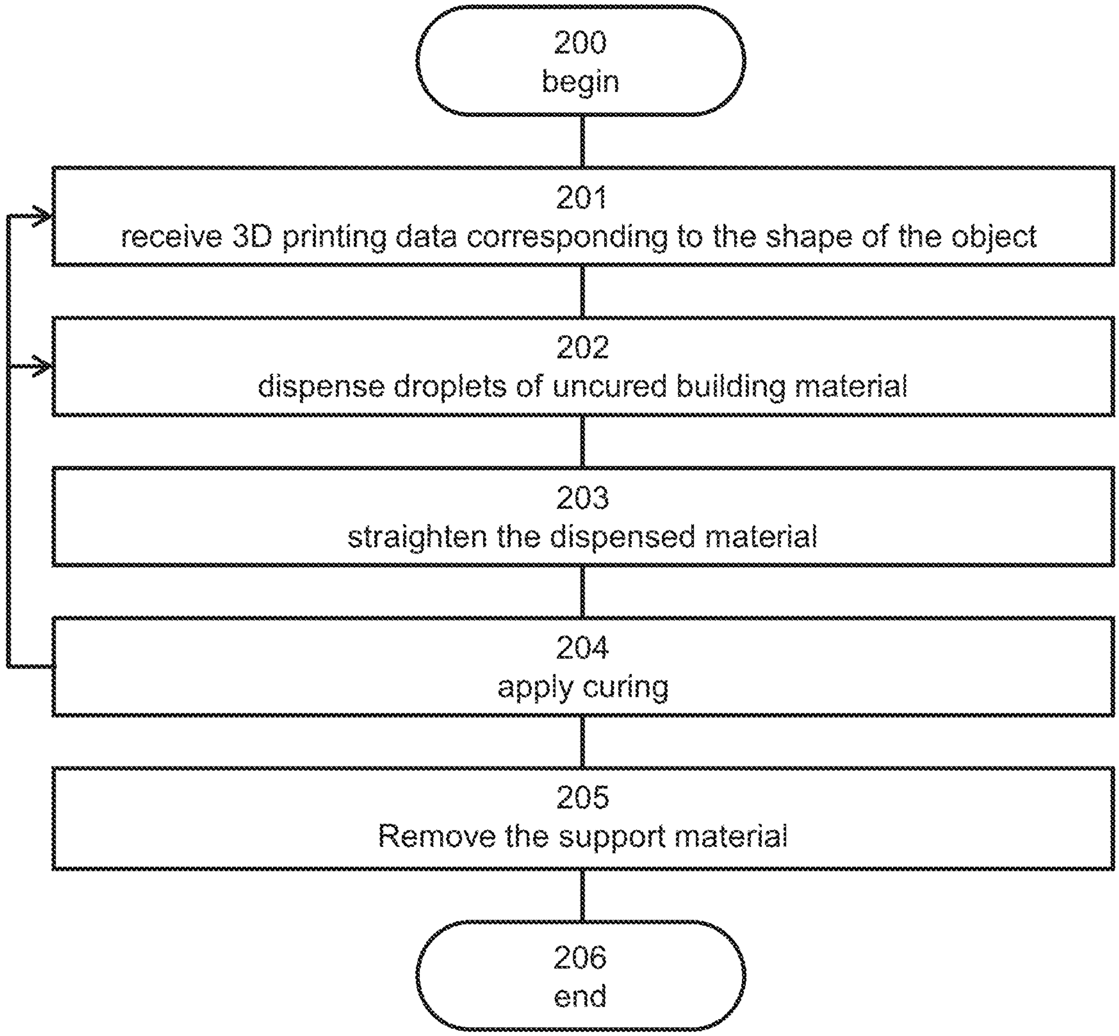
FIG. 4 is a flowchart diagram of a method suitable for AM of a three-dimensional object according to various exemplary embodiments of the present invention.

FIG. 4 is a flowchart diagram of a method of additive manufacturing of at least one tubular structure featuring properties of a blood vessel, according to some embodiments of the present invention. The method begins at 200 and optionally and preferably proceeds to 201 at which 3D printing data in any of the aforementioned computer object data formats are obtained.

The method can proceed to 202 at which droplets of one or more uncured building material formulation(s) are dispensed to form a layer. The building material formulation can be a modeling material formulation such as, but not limited to, formulation M providing hardened Material M when exposed to a curing condition as described herein, and/or a support material formulation such as, but not limited to, formulation FG providing hardened Material FG when exposed to a curing condition, as described herein, and/or formulation S providing hardened Material S when exposed to a curing condition, as described herein, as described herein, and/or formulation L providing hardened Material L when exposed to a curing condition, as described herein.

The modeling material formulation is preferably dispensed in a configured pattern corresponding to the shape of the object and in accordance with the computer object data. The other building material formulations are preferably dispensed in accordance with the computer object data, but not necessarily in accordance with the shape of the object, since these building material formulations are typically sacrificial.

Optionally, before being dispensed, the uncured building material, or a part thereof (e.g., one or more formulations of the building material), is heated, prior to being dispensed. These embodiments are particularly useful for uncured building material formulations having relatively high viscosity at the operation temperature of the working chamber of a 3D inkjet printing system. The heating of the formulation(s) is preferably to a temperature that allows jetting the respective formulation through a nozzle of a printing head of a 3D inkjet printing system. In some embodiments of the present invention, the heating is to a temperature at which the respective formulation exhibits a viscosity of no more than X centipoises, where X is about 30 centipoises, preferably about 25 centipoises and more preferably about 20 centipoises, or 18 centipoises, or 16 centipoises, or 14 centipoises, or 12 centipoises, or 10 centipoises, or even lower.

The heating can be executed before loading the respective formulation into the printing head of the AM (e.g., 3D inkjet printing) system, or while the formulation is in the printing head or while the composition passes through the nozzle of the printing head.

In some embodiments, the heating is executed before loading of the respective formulation into the dispensing (e.g., inkjet printing) head, so as to avoid clogging of the dispensing (e.g., inkjet printing) head by the formulation in case its viscosity is too high.

In some embodiments, the heating is executed by heating the dispensing (e.g., inkjet printing) heads, at least while passing the modeling material formulation(s) through the nozzle of the dispensing (e.g., inkjet printing) head.

In some embodiments, during the dispensing of at least one of formulation FG and formulation L the operation of the cooling system described below is temporarily terminated, so as to maintain a still-air environment.

As used herein, "still-air environment" refers to an environment in which there is no air flow, or in which an air flows at speed less than 3 m/s.

At 203 the newly dispensed layer is straightened, for example, using a leveling device 32 or 132, which is optionally and preferably rotatable. When the newly dispensed layer contains formulation FG and/or formulation L, the rotation speed of the leveling device is preferably changed, typically reduced, relative to its speed when straightening other layers. The control over the rotation speed of the leveling device can be done by a controller (e.g., controller 20 or controller 340).

The method optionally and preferably proceeds to 204 at which the deposited layer is exposed to a curing condition (e.g., curing energy is applied), e.g., by means of a hardening device, for example, a radiation source as described herein. Preferably, the curing is applied to each individual layer following the deposition of the layer and prior to the deposition of the previous layer. Optionally, the deposited (dispensed) layers are exposed to the curing condition other than a curing energy, such as, but not limited to, contact with a chemical reagent or exposure to the environment.

Operations 202-204, and in some embodiments also 201, are preferably executed sequentially a plurality of times so that a plurality of layers are sequentially dispensed and solidified. This is illustrated in FIG. 4 as loop back arrows pointing from operation 204 to operations 201 and 202. The layers are dispensed to form a stack of model layers made of a modeling material formulation, and a sacrificial structure, wherein the stack of model layers and the sacrificial structure are separable from each other in a manner that maintains the shape and size of the stack of model layers without deformation. In various exemplary embodiments of the invention operations 202-204 are executed to so that the layers form an elongated core and a shell encapsulating the core, wherein the core is optionally and preferably the sacrificial structure as further detailed hereinunder. In some embodiments of the present invention these operations are executed also to form an intermediate shell between the core and the shell as further detailed hereinunder. Each of the core, the shell and the intermediate shell (when formed) is optionally and preferably formed by dispensing a different building material formulation or a different combination of building material formulations. The core and the intermediate shell (when formed) are optionally and preferably formed by dispensing a building material that can be removed after the object is completed, and are therefore sacrificial, as described herein.

In some embodiments of the present invention the method dispenses digital material formulation for at least one of the layers.

The phrase "digital material formulations", as used herein and in the art, describes a combination of two or more material formulations that are interlaced with each such that the printed zones of a specific material formulation occupy a voxel, or few voxels, or a voxel block, at least partially surrounded by a voxel, or few voxels, or a voxel block of another material formulation. Such digital material formulations may exhibit new properties that are affected by the selection of types of material formulations and/or the ratio and relative spatial distribution of two or more material formulations.

In exemplary digital material formulations, the modeling or support material formulation of each voxel or voxel block, obtained upon curing, is independent of the modeling or support material formulation of a neighboring voxel or voxel block, obtained upon curing, such that each voxel or voxel block may result in a different modeling or support material formulation and the new properties of the whole object are a result of a spatial combination, on the voxel level, of several different model material formulations. In various exemplary embodiments of the invention operations 202-204 are executed to form, for at least a portion of layers, voxel elements containing different building material formulations at interlaced locations.

As used herein, a "voxel" of a layer refers to a physical three-dimensional elementary volume within the layer that corresponds to a single pixel of a bitmap describing the layer. The size of a voxel is approximately the size of a region that is formed by a building material, once the building material is dispensed at a location corresponding to the respective pixel, leveled, and solidified.

Herein throughout, whenever the expression "at the voxel level" is used in the context of a different material and/or properties, it is meant to include differences between voxel blocks, as well as differences between voxels or groups of few voxels. In preferred embodiments, the properties of the whole part are a result of a spatial combination, on the voxel block level, of several different model materials.

In some embodiments, at least one, or at least a few (e.g., at least 10, at least 20, at least 30 at least 40, at least 50, at least 60, at least 80, or more), of the layers is/are formed by dispensing droplets of two or more building material formulations at interlaced locations, each building material formulation from a different nozzle array. These building material formulations can include: (i) two or more modeling material formulations as described herein in any of the respective embodiments, (ii) at least one modeling material formulation and at least one support material formulation as described herein in any of the respective embodiments, or (iii) two or more support material formulations as described herein in any of the respective embodiments.

In some embodiments, the method continues to 205, at which the hardened material FG and/or material L or a digital material containing one or more of hardened materials is removed from the printed object, to thereby reveal the final object. The removal 205 can be in more than one way.

In some embodiments of the present invention the removal 205 is by application of pressure into a cavity or cavities filled by these hardened materials. The pressure is optionally and preferably sufficient to effect a flow of the hardened material FG or material L out of the cavity without causing pressure induced damage to the shell or shells enclosing the cavity. Optionally, and preferably in case the liquid or liquid-like material features a thermal-thinning behavior, the object is heated, for example, to a temperature of from about 40° C. to about 95° C. prior to the removal of the liquid or liquid-like material.

When the removal 205 is by application of pressure, the pressure can be, for example, an air pressure, or a liquid pressure, for example, in a form of a jet of an aqueous solution (e.g., water).

The pressure is preferably no more than 1 bar, or no more than 0.5, or no more than 0.3 bar, and can be, for example, 0.1 bar, 0.2 bar, or 0.3 bar.

Alternatively, and optionally in addition to the above, and particularly in cases where the material to be removed is not sufficiently flowable at ambient conditions, the removal 205 is preceded by applying a condition that renders the material flowable. Such conditions include, for example, application of shear forces (for example, when the material to be removed is a shear-thinning material), and/or application of heat (for example, when the material to be removed is a thermo-thinning material).

Optionally and preferably, hardened support structures (e.g., made of hardened material S) is also removed at 205. When the hardened support structure forms the intermediate shell, its removal is optionally and preferably by circulating in the cavity occupied by the intermediate shell a solution capable of removing the hardened support structure. For example, the hardened material S can be water-soluble or water-miscible, in which case it can be removed by contacting an aqueous solution at which it is dissolvable or dispersible (e.g., a cleaning solution; an aqueous solution that comprises an alkaline substance, at an amount of about 1% to about 3% by weight of the solution).

In some embodiments of the present invention the hardened support structure forms a pullable core surrounded by an intermediate shell made of flowable material (e.g., hardened material FG or material L), itself surrounded by a non-flowable shell. In these embodiments the removal 205 can be effected by pulling the pullable core out through an open end of the shell.

The method ends at 206.

FIGS. 12A and 12B are schematic illustrations of a tubular structure 300 according to some embodiments of the present invention. Tubular structure 300 is preferably fabricated by AM (for example, by operating one of AM systems 10 and 110) from building material formulations, for example, by executing selected operations of method 200. In various exemplary embodiments of the invention tubular structure 300 has a shape, and optionally and preferably also mechanical properties, of a blood vessel. Tubular structure 300 can comprise an elongated core 302 and a solid shell 308 encapsulating core 302.

In some embodiments, the smallest dimension of shell 308 (e.g., its outer diameter) is, from about 0.1 mm to about 5 cm, or from about 1 mm to about 3 cm. In some embodiments, the wall thickness of shell 308 is from about 0.1 mm to about 5 mm, or from about 0.1 mm to about 3 mm. Other dimensions are also contemplated.

Core 302 is optionally and preferably sacrificial. In some optional and preferred embodiments, tubular structure 300 also comprises an intermediate shell 304 between core 302 and shell 308. In some optional and preferred embodiments, tubular structure 300 also comprises more than one intermediate shell between core 302 and shell 308. Embodiments in which tubular structure 300 comprises a single intermediate shell are illustrated in FIG. 12A, and embodiments in which tubular structure 300 comprises more than one intermediate shells are illustrated in FIG. 12B (two such intermediate shells 304 and 306 are shown in this exemplified illustration, but any number of intermediate shells can be included). The intermediate shell(s) are optionally and preferably also sacrificial.

Each of core 302, shell 308 and the intermediate shells 304, 306 is optionally and preferably made of a different material or a different combination of materials.

In some embodiments of the present invention shell 308 comprises hardened material M, as defined herein. Intermediate shell 304 can comprise material FG. In some embodiments of the present invention shell 304 comprises only material FG and is devoid of other materials. Shell 306 can in some embodiments comprises hardened material S.

Core 302 can be made in more than one way. In some embodiments of the present invention core 302 is made of a digital material that comprises material FG and material M, interlaced with each other. These embodiments are particularly useful when it is desired to fabricate tubular structures that have non uniform diameter along their length. In some embodiments, core 302 is formed of Material M, without interlacing it with an additional material. In these embodiments core 302 is are pullable, and they are particularly useful when it is desired to fabricate tubular structures that have a generally uniform diameter (e.g., with tolerance of less than 10%). The latter embodiments are also useful when the shape of tubular structure 300 is intricate with low-radius curves.

It is to be understood that other combinations of materials can be used for structure 300. For example, in some embodiments of the present invention, core 302 is made of hardened material FG, and intermediate shell 304 can be made of hardened material S or a digital material comprising hardened material S, as described herein. The inventors found that such intermediate shell significantly reduces the likelihood of inward collapse. Also contemplated is a configuration in which core 302 is made of hardened material FG, as defined herein, and intermediate shell 304 is made of a material L, as defined herein. The advantage of these embodiments is that the non-solid intermediate shell 204 reduces friction and therefor facilitates easy removal of core 302 from tubular structure 300.

It was found by the Inventors that the quality of the fabricated three-dimensional objects may be affected by the orientation of parts of the object with respect to the direction of the relative motion between the tray and the dispensing head. The inventors have therefore devised a procedure in which the orientation of the part of the object and the formulation or combination of formulations that are used to fabricate this part are selected based on each other. In particular, it was found that a judicious selection of the formulation or formulations based on the orientation of the part of the object can facilitate an easier removal of the support material following the fabrication of the object.

When the part of object is aligned generally along the indexing direction (y or r) it is preferred to fabricate the core using a digital material formulation which comprises an FG formulation and a modeling material formulation M, where the M formulation serves for reinforcing the FG formulation.

When the part of the object is aligned generally along the scanning direction (x or φ) it is preferred to fabricate the core either using a FG formulation or using a digital material formulation which comprises an FG formulation and a modeling material formulation M, where the M formulation serves for reinforcing the FG formulation.

Representative examples for the M formulations, include, without limitation, any of the modeling materials marketed by Stratasys, Israel, under the trade name Agilus™ family or Vero™ family.

When the core is fabricated using a digital material formulation which comprises an FG formulation and a modeling material formulation M, the preferred voxel-level ratio between the number of voxels p of formulation FG and the number of voxels q of formulation M is from p:q of about 60:40 to p:q of about 80:20, e.g., p:q of about 70:30.

The Inventor also discovered that when the part of the object is fabricated using a digital material formulation, the elementary units within the digital material formulation may affect the mechanical properties of the fabricated part of the object. For example, suppose that a digital material formulation includes a first formulation (e.g., an M formulation) and a second formulation (e.g., an FG formulation), where formulations are dispensed in a manner that the first formulation forms a plurality of cubical structures that are distributed within the second formulation, in a manner that one or more, e.g., each, of the cubical structures of the first formulation is surrounded by the second formulation. The inventors found that the mechanical properties of the part can be adjusted by a judicial selection of the orientation of the cubical structures with respect to the scanning direction. In particular, it was found that internal sacrificial parts are easier to be removed when the cubical structures of the first formulation are at an acute angle (for example, from about 20° to about 70°, or from about 30° to about 60°, e.g., about 45°) relative to the scanning direction.

In a preferred embodiment, an object is formed to include a core (e.g., core 302) a shell (e.g., shell 308) and one or more intermediate shells (e.g., intermediate shells 304 and 396), wherein the core of the object is fabricated using a digital material formulation which comprises an FG formulation and a modeling material formulation M, wherein the M formulation is dispensed to form cubical structures that are oriented at an angle of about 45° with respect to the scanning direction (x or φ), and wherein the intermediate shell is formed of a support formulation S. This embodiment allows an easy removal of the core and is particularly useful when the objects mimics a blood vessel. Preferred sizes of the cubical structures is from about 0.5 to about 1.5 mm along the main diagonal. Preferred thickness of the intermediate shell is from about 0.01 mm to about 0.5 mm. The preferred voxel-level ratio between the number of voxels p of formulation FG in the core and the number of voxels q of formulation M in the core is from p:q of about 60:40 to p:q of about 80:20, e.g., p:q of about 70:30.

According to an aspect of some embodiments of the present invention, there is provided a three-dimension model object prepared by the method as described herein, in any of the embodiments thereof and any combination thereof.

According to an aspect of some embodiments of the present invention there is provided a 3D model object as described herein.

While the above description of the system and method places a particular emphasis on embodiments in which the layers are formed by selective dispensing and curing of the building material formulation (e.g., one or more modeling material formulations as described herein and optionally a support material formulation), it is to be understood that more detailed reference to such technique is not to be interpreted as limiting the scope of the invention in any way. For example, other practitioners in the field form the layers by vat-based techniques, such as but not limited to, stereolithography, and DLP (to this end see, e.g., in U.S. Pat. Nos. 4,575,330 and 9,211,678 supra).

Thus, also contemplated are embodiments in which the system comprises a vat-based system or apparatus, e.g., a stereolithography or a DLP system or apparatus. As previously indicated, a vat-based technique comprises a vat containing the material which is exposed to a curing condition, typically is irradiated by curing radiation, in a configured pattern corresponding to the shape of a slice of the object, to form solid objects by successively forming thin layers of a curable material one on top of the other.

When the additive manufacturing utilizes stereolithography, a programmed movable spot beam of curing radiation is directed on a surface or layer of a curable fluid medium (one or more modeling material formulations and optionally also a support material formulation) to form a solid layer of the object at the surface. Typically, the formulations are UV-curable formulations and the curing radiation is UV radiation. Once a solid layer of the object is formed, the layer is moved, in a programmed manner, away from the fluid surface by the thickness of one layer and the next cross-section is then formed and adhered to the immediately preceding layer defining the object. This process is continued until the entire object is formed.

When the additive manufacturing utilizes a DLP, a digital light processor projects curing radiation which constitutes a digital image of a slice of the object, preferably from below, to form a solid layer of the object at the surface of the dispensed layer of a curable formulation. Typically, the curable formulation is a UV-curable formulation and the curing radiation is UV radiation. Once a solid layer of the object is formed, the layer is moved, in a programmed manner, away from the image plane of the digital light processor by the thickness of one layer and the next cross-section is then formed and adhered to the immediately preceding layer defining the object. This process is continued until the entire object is formed. It is expected that during the life of a patent maturing from this application many relevant curable and non-curable will be developed and the scope of the materials described and claimed herein is intended to include all such new technologies a priori.

As used herein the term “about” refers to ±10% or ±5%.

The terms “comprises”, “comprising”, “includes”, “including”, “having” and their conjugates mean “including but not limited to”.

The term “consisting of” means “including and limited to”.

The term “consisting essentially of” means that the composition, method or structure may include additional ingredients, steps and/or parts, but only if the additional ingredients, steps and/or parts do not materially alter the basic and novel characteristics of the claimed composition, method or structure.

As used herein, the singular form “a”, “an” and “the” include plural references unless the context clearly dictates otherwise. For example, the term “a compound” or “at least one compound” may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases “ranging/ranges between” a first indicate number and a second indicate number and “ranging/ranges from” a first indicate number “to” a second indicate number are used herein interchangeably and are meant to include the first and second indicated numbers and all the fractional and integral numerals therebetween.

As used herein the term “method” refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Herein, the phrase “acrylic material” encompasses acrylate, methacrylate, acrylamide and methacrylamide compounds.

Herein throughout, the term “(meth)acrylic” encompasses acrylic and methacrylic compounds.

Herein, a liquid material L describes a liquid or liquid-like material.

Herein throughout and in the art, the term “liquid” describes a fluid that does not change its volume in response to stress. Liquid materials are characterized by fluidity, that is, the ability to flow as the molecules move by passing one by another; a viscosity, that is, a resistance to shear stress; by very low or zero shear modulus (G); and by a shear loss modulus to shear storage modulus ratio (G"/G', or tan delta) higher than 1, typically higher than 10.

Herein, a “liquid-like material” describes a material that features properties similar to those of a liquid, by featuring, for example, a low shear modulus, e.g., lower than 100 kPa or lower than 50 kPa or lower than 10 kPa; and/or by a shear loss modulus to shear storage modulus ratio (tan delta) higher than 1 as described herein, optionally higher than 5 or higher than 10, and hence its fluidity, viscosity and flowability resemble those of a liquid.

A liquid-like material can feature the above-mentioned properties of a liquid upon application of shear forces. A liquid-like material can be a shear-thinning material or a thixotropic material, that is, a material that features a shear-thinning behavior or thixotropy, respectively.

A liquid-like material can feature the above-mentioned properties of a liquid upon application of heat energy. A liquid-like material can be a thermal-thinning material, that is, a material that features a thermal-thinning behavior.

A liquid-like material can have a consistency and/or rheological properties of a gel or a paste.

Liquid and liquid-like materials can feature one or more of the following characteristics: a viscosity of no more than 10000 centipoises; and/or Shear loss modulus to Shear storage modulus ratio (tan delta) greater than 1; and/or Shear-thinning and/or thixotropic behavior; and/or Thermal-thinning behavior; and/or a Shear storage modulus lower than 20 kPa; and/or flowability when subjected to a positive pressure lower than 1 bar or lower than 0.5 bar.

Shear storage modulus, G', is also referred to herein interchangeably as "storage shear modulus", and reflects an elastic behavior of a material. Liquid materials are typically non-elastic and hence feature a low shear storage modulus.

Shear loss modulus, G", is also referred to herein interchangeably as "loss shear modulus", and reflects a viscous behavior of a material.

Storage shear modulus and loss shear modulus may optionally be determined using a shear rheometer, for example, a strain-controlled rotational rheometer, at an indicated temperature and frequency (e.g., using procedures well known in the art).

The Shear loss modulus to Shear storage modulus ratio, G"/G', also known as "tan delta", reflects the viscoelastic behavior of a material. Liquid materials are typically more viscous and non-elastic and hence for liquids or liquid-like materials this ratio is higher than 1. Gels are typically elastic and hence this ratio for gel or gel-like materials is lower than 1.

Herein throughout, the term "shear-thinning" describes a property of a fluidic compound or a material that is reflected by a decrease in its viscosity (increase in its fluidity) upon application of shear forces (under shear strain). In some of the present embodiments, a shear-thinning material is such that exhibits a significant, e.g., at least 100%, reduction in its Shear modulus upon increasing the shear strain from about 1% to above 50%.

Herein throughout, the term "thixotropic" describes a property of a fluidic compound or material that is reflected by a time-dependent shear-thinning, that is its viscosity is decreased in correlation with the time at which shear forces are applied, and returns back to its original value when application of shear forces is ceased. In some of the present embodiments, a thixotropic material is such that exhibits a significant, e.g., at least 100%, reduction in its Shear modulus under 50% strain.

Herein throughout, the term "thermal-thinning" describes a property of a fluidic compound or a material that is reflected by a decrease in its viscosity (increase in its fluidity) upon application of heat energy (increase in temperature). In some of the present embodiments, thermal-thinning materials feature a decrease in viscosity or shear modulus by at least 20%, or at least 50%, or even 100%, upon being heated to a temperature of from 40 to 95° C., including any intermediate value and subranges therebetween.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 20, and is preferably lower, e.g., from 1 to 10, or from 1 to 6, or from 1 to 4. A hydrocarbon can be a linking group or an end group.

Bisphenol A is an example of a hydrocarbon comprised of 2 aryl groups and one alkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Herein, a C(1-4) alkyl, substituted by a hydrophilic group, as defined herein, is included under the phrase "hydrophilic group" herein.

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

Cycloalkyls of 1-6 carbon atoms, substituted by two or more hydrophilic groups, as defined herein, is included under the phrase "hydrophilic group" herein.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino, oxalidine, and the like.

The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

A heteroalicyclic group which includes one or more of electron-donating atoms such as nitrogen and oxygen, and in which a numeral ratio of carbon atoms to heteroatoms is 5:1 or lower, is included under the phrase "hydrophilic group" herein.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a $—O—S(=O)_2—OR'$ end group, as this term is defined hereinabove, or an $—O—S(=O)_2—O—$ linking group, as these phrases are defined hereinabove, where R' is as defined hereinabove.

The term "thiosulfate" describes a $—O—S(=S)(=O)—OR'$ end group or a $—O—S(=S)(=O)—O—$ linking group, as these phrases are defined hereinabove, where R' is as defined hereinabove.

The term "sulfite" describes an $—O—S(=O)—O—R'$ end group or a $—O—S(=O)—O—$ group linking group, as these phrases are defined hereinabove, where R' is as defined hereinabove.

The term "thiosulfite" describes a $—O—S(=S)—O—R'$ end group or an $—O—S(=S)—O—$ group linking group, as these phrases are defined hereinabove, where R' is as defined hereinabove.

The term "sulfinate" describes a $—S(=O)—OR'$ end group or an $—S(=O)—O—$ group linking group, as these phrases are defined hereinabove, where R' is as defined hereinabove.

The term "sulfoxide" or "sulfinyl" describes a $—S(=O)R'$ end group or an $—S(=O)—$ linking group, as these phrases are defined hereinabove, where R' is as defined hereinabove.

The term "sulfonate" describes a $—S(=O)_2—R'$ end group or an $—S(=O)_2—$ linking group, as these phrases are defined hereinabove, where R' is as defined herein.

The term "S-sulfonamide" describes a $—S(=O)_2—NR'R''$ end group or a $—S(=O)_2—NR'—$ linking group, as these phrases are defined hereinabove, with R' and R" as defined herein.

The term "N-sulfonamide" describes an $R'S(=O)_2—NR''—$ end group or a $—S(=O)_2—NR'—$ linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(=O)(OR')(OR") end group or a —P(=O)(OR')(O)— linking group, as these phrases are defined hereinabove, with R' and R" as defined herein.

The term "thiophosphonate" describes a —P(=S)(OR')(OR") end group or a —P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a —P(=O)(R')— linking group, as these phrases are defined hereinabove, with R' and R" as defined herein.

The term "phosphine sulfide" describes a —P(=S)(R')(R") end group or a —P(=S)(R')— linking group, as these phrases are defined hereinabove, with R' and R" as defined herein.

The term "phosphite" describes an —O—PR'(=O)(OR") end group or an —O—PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein.

The term "thiocarbonyl" as used herein, describes a —C(=S)—R' end group or a —C(=S)— linking group, as these phrases are defined hereinabove, with R' as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a =N—OH end group or a =N—O— linking group, as these phrases are defined hereinabove.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "isocyanate" describes an —N=C=O group.

The term "isothiocyanate" describes an —N=C=S group.

The term "nitro" describes an —$NO_2$ group.

The term "acyl halide" describes a —(C=O)R"" group wherein R"" is halide, as defined hereinabove.

The term "azo" or "diazo" describes an —N=NR' end group or an —N=N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate.

The term "C-carboxylate" describes a —C(=O)—OR' end group or a —C(=O)—O— linking group, as these phrases are defined hereinabove, where R' is as defined herein.

The term "O-carboxylate" describes a —OC(=O)R' end group or a —OC(=O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—OR' end group or a —C(=S)—O— linking group, as these phrases are defined hereinabove, where R' is as defined herein.

The term "O-thiocarboxylate" describes a —OC(=S)R' end group or a —OC(=S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(=O)—NR'— end group or a —OC(=O)—NR'— linking group, as these phrases are defined hereinabove, with R' and R" as defined herein.

The term "O-carbamate" describes an —OC(=O)—NR'R" end group or an —OC(=O)—NR'— linking group, as these phrases are defined hereinabove, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NR' R" end group or a —OC(=S)—NR'— linking group, as these phrases are defined hereinabove, with R' and R" as defined herein.

The term "N-thiocarbamate" describes an R"OC(=S)NR'— end group or a —OC(=S)NR'— linking group, as these phrases are defined hereinabove, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(═S)—NR' R" end group or a —SC(═S)NR'— linking group, as these phrases are defined hereinabove, with R' and R" as defined herein.

The term "N-dithiocarbamate" describes an R"SC(═S)NR'— end group or a —SC(═S)NR'— linking group, as these phrases are defined hereinabove, with R' and R" as defined herein.

The term "urea", which is also referred to herein as "ureido", describes a —NR'C(═O)—NR"R''' end group or a —NR'C(═O)—NR"— linking group, as these phrases are defined hereinabove, where R' and R" are as defined herein and R''' is as defined herein for R' and R".

The term "thiourea", which is also referred to herein as "thioureido", describes a —NR'—C(═S)—NR"R''' end group or a —NR'—C(═S)—NR"— linking group, with R', R" and R''' as defined herein.

The term "amide" as used herein encompasses C-amide and N-amide.

The term "C-amide" describes a —C(═O)—NR'R" end group or a —C(═O)—NR'— linking group, as these phrases are defined hereinabove, where R' and R" are as defined herein.

The term "N-amide" describes a R'C(═O)—NR"— end group or a R'C(═O)—N— linking group, as these phrases are defined hereinabove, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R"NC(═N)— end group or a —R'NC(═N)— linking group, as these phrases are defined hereinabove, where R' and R" are as defined herein.

The term "guanidine" describes a —R'NC(═N)—NR"R''' end group or a —R'NC(═N)—NR"— linking group, as these phrases are defined hereinabove, where R', R" and R''' are as defined herein.

The term "hydrazine" describes a —NR'—NR"R''' end group or a —NR'—NR"— linking group, as these phrases are defined hereinabove, with R', R", and R''' as defined herein.

As used herein, the term "hydrazide" describes a —C(═O)—NR'—NR"R''' end group or a —C(═O)—NR'—NR"— linking group, as these phrases are defined hereinabove, where R', R" and R''' are as defined herein.

As used herein, the term "thiohydrazide" describes a —C(═S)—NR'—NR"R''' end group or a —C(═S)—NR'—NR"— linking group, as these phrases are defined hereinabove, where R', R" and R''' are as defined herein.

As used herein, the term "alkylene glycol" describes a —O—[(CR'R")$_z$—O]$_y$—R''' end group or a —O—[(CR'R")$_z$—O]$_y$— linking group, with R', R" and R''' being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo(alkylene glycol).

When y is greater than 4, the alkylene glycol is referred to herein as poly(alkylene glycol). In some embodiments of the present invention, a poly(alkylene glycol) group or moiety can have from 10 to 200 repeating alkylene glycol units, such that z is 10 to 200, preferably 10-100, more preferably 10-50.

The term "silanol" describes a —Si(OH)R'R" group, or —Si(OH)$_2$R' group or —Si(OH)$_3$ group, with R' and R" as described herein.

The term "silyl" describes a —SiR'R"R''' group, with R', R" and R''' as described herein.

As used herein, the term "urethane" or "urethane moiety" or "urethane group" describes a Rx—O—C(═O)—NR'R" end group or a —Rx—O—C(═O)—NR'— linking group, with R' and R" being as defined herein, and Rx being an alkyl, cycloalkyl, aryl, alkylene glycol or any combination thereof. Preferably R' and R" are both hydrogen.

The term "polyurethane" or "oligourethane" describes a moiety that comprises at least one urethane group as described herein in the repeating backbone units thereof, or at least one urethane bond, —O—C(═O)—NR═—, in the repeating backbone units thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Flow Gel Formulations

Table 1 below presents the chemical compositions of exemplary formulations that provide, when exposed to UV irradiation, a flow gel formulation as defined herein.

TABLE 1

| Component | Exemplary Materials | Percentage (%) |
|---|---|---|
| Monofunctional curable material | Poly(ethylene glycol) acrylate<br>Hydroxyalkyl acrylic material | 3-10 |
| Multifunctional hydrophilic curable material | Multifunctional Poly(alkylene glycol)-containing acrylic material) | 1-5 |
| Non-curable material(s) | 1,2-Propanediol (Propylene glycol)<br>1,2,3-Propanetriol (Glycerol)<br>Polypropylene glycol (e.g., PPG600)<br>Polyethylene glycol (e.g., PEG400)<br>Propylene carbonate<br>Polyol 3165 | 80-90 |
| Photoinitiator | BAPO type (Bis Acyl Phosphine Oxide)<br>Alpha Hydroxy ketone<br>MAPO (Monoacylphosphine oxides) | 1-3 |

TABLE 1-continued

| Component | Exemplary Materials | Percentage (%) |
|---|---|---|
| Surfactant/ Dispersant | BYK Type (PDMS derivatives) | 0-1 |
| Inhibitor | MEHQ Genorad Type | 0.1-2 |

All tested formulations feature viscosity at 75° C. of 10-30 (e.g., 10-15) centipoises, and surface tension at 25° C. of 20-50 (e.g., 30-40) mN/m$^2$. The formulations were successfully used in 3D inkjet printing (are jettable), with no curling of the printed object.

Shelf-life stability of the formulations was assessed by measuring the viscosity and surface tension after storage at 65° C. for 14 days. No change in viscosity and surface tension was observed. The stability of the formulation as measured in these tests, during 14 days, is indicative of a stability of the formulation when stored at room temperature for 8 months.

Models printed using these formulations exhibited Young's modulus values, as determined e.g. by ASTM E111, of less than 0.1 MPa, typically around 0.05 MPa±20%.

It is to be noted that formulations comprising monofunctional curable materials in an amount of 10-15% by weight, but were lacking a multifunctional curable material provided materials that did not meet jettability requirements of for some inkjet AM systems, and produced hardened materials that were for example, too sticky (data not shown).

A formulation as presented in Table 1 and described herein is also referred to as FLG.

The solubility of the formulations was tested by immersing a 40×20×10 mm cube printed using the formulations, made of a hardened in 2% NaOH aqueous solution.

Solubility was measured either for objects made of a single formulation e (S), or of a mixture of two formulations, either two support formulations or a support formulation and a model formulation such as Agilus™ or Vero™ such that a core made of the FG formulation was coated with 1 mm layer of the other formulation (DM). Coated objects were tested upon cutting a 40×10 mm sidewall, for exposing the core (as shown, for example, in FIG. 5C).

The commercially available SUP706 formulation was used for reference as a single support formulation (S).

Tables 2A and 2B below present the dissolution times observed for each of the tested objects with (Table 2A) and without (Table 2B) stirring.

TABLE 2A

| Formulation | Type | Time to complete dissolution (minutes) |
|---|---|---|
| FLG | S | 50 |
| SUP706 | S | 230 |
| FLG/SUP706 (1:1) | DM | 65 |
| FLG/Agilus (1:1) | DM | 110 |
| FLG/Vero (1:1) | DM | 95 |

TABLE 2B

| Formulation | Type | Time to complete dissolution (hour) |
|---|---|---|
| FLG | S | 1 |
| SUP706 | S | 96 |
| FLG/SUP706 (75:25) | DM | 72 |
| FLG/SUP706 (50:50) | DM | 72 |
| FLG/SUP706 (25:75) | DM | 72 |

Additional objects, 40×20×10 mm cubes, were printed in a DM mode in which a DM core was made of an FG formulation having therein a grid made of a model formulation (e.g., Agilus™), and a coating of about 1 mm thickness was made of the model formulation (Agilus™)

FIG. 5A-5C presents photographs showing such a printed object (FIG. 5A) and of the object during (FIG. 5B) and after (FIG. 5C) dissolution of the core in a 2% NaOH solution. The sidewall of the object was cut before dissolution was effected.

Example 2

3D Inkjet Printed Objects

When the object is aligned generally along the x direction good results were achieved by printing a core made of an FG formulation or a DM core made of an FG formulation reinforced with a grid made of a modeling material formulation M as described herein (e.g., Agilus, Vero). When the object is aligned generally along the y direction good results were achieved by printing a DM core made of an FG formulation reinforced with a grid made of a modeling material formulation M as described herein. DM structure was composed of about 30% grid of material M and about 70% of material FG. One preferred DM structure (easy to clean) for printing within the internal space of blood vessel mimics is made of FG material with pre-set grid made of Agilus cubes, 0.5-1.5 mm in diameter, oriented at an angle of about 45° with respect to the tray, and a thin (≤0.5 mm) outline of SUP706. Optimal jetting temperature of material FG is between 65-75° C.

It was found by the Inventors that when a modeling material formulation was embedded during the printing within an embedding material, the mechanical properties of the modeling material formulation were modified by the embedding material, even after the embedding material is removed. To further investigate this phenomenon, the ability of four types of embedding materials to modify the mechanical properties of Agilus™ were tested. The tested embedding materials were a first exemplary FG formulation according to the present embodiments which comprises hydrophilic curable materials that provide, when hardened per se water insoluble material (referred to as FLG334A), a second exemplary FG formulation according to the present embodiments which comprises hydrophilic curable materials that provide, when hardened per se, water soluble material (referred to as FLG-PA4), a support formulation SUP706 or a Liquid formulation (which provides a liquid or liquid-like material upon exposure to a curing condition.

To this end, "Dog bones" models made of Agilus™ as the model material were printed on J750 (Stratasys Ltd., Israel) in High Mix mode, such that the arms of the bone were supported by support material SUP706, and the hinge of the bone was embedded within the embedding material under investigation. This is schematically illustrated in FIG. 7A. The Agilus™ model material is shown at 710, the support material is shown at 712 and the embedding material is shown at 714. FIG. 7B illustrates the fabricated dog bone model following the removal of the support material. The Agilus™ model material, once modified by the embedding material 714, is shown at 716. FIG. 7C illustrates the fabricated dog bone model following the removal of the embedding material. The unmodified (710) and modified (716) Agilus™ model materials are illustrated in FIGS. 7B and 7C using different line patterns. The Stress-Strain curve of the modified Agilus was measured, and the results, for the four tested types of embedding material are shown in FIG. 8. As shown therein, FLG334A provides the obtained model with better mechanical properties than the reference formulation SUP706, the liquid, and the PA4 formulation.

FIGS. 6A and 6B present two DM printing modes utilizing a FG support material formulation according to the present embodiments. Both FIGS. 6A and 6B illustrate a structure 600 having a tubular core 602 and one or more shells 604, 606, 608 surrounding core 602. Preferably structure 600 comprises core 600 and shells 604 and 608. Optionally, structure 600 also comprises shell 606 between shells 604 and 608. Shell 608 is the outermost shell and typically comprises a material M such as Agilus™. Shell 604 is adjacent to core 602 and typically comprises only material FG. Optional shell 606 typically comprises a support material S such as SUP706. FIG. 6A illustrates an embodiment, referred to herein as Geometry 1, in which core 602 is formed of material FG reinforced by material M (e.g., Agilus™). Material FG and Material M are typically dispensed in an interlaced manner to form a digital material as described herein. FIG. 6B illustrates an embodiment, referred to herein as Geometry 2, in which core 602 is formed of Material M. In this embodiment a pullable core 602 is formed, as demonstrated below (see FIGS. 10 and 11).

Printing according to the embodiment illustrated in FIG. 6A is particularly useful when it is desired to fabricate hollow tubular structures that have non uniform diameter along their length. Printing according to the embodiment illustrated in FIG. 6B is particularly useful when it is desired to fabricate hollow tubular structures that generally feature uniform diameter, and may also be used for intricate tubular shapes having low-radius curves.

FIG. 9 presents photographs demonstrating the support material removal from an object made according to Geometry 1 mode as shown in FIG. 6A using an FG formulation according to the present embodiments. As shown therein, by application of small pressure, the hardened support material is easily removed to thereby reveal a hollow tubular structure.

Printing according to Geometry 2 as shown in FIG. 6B is usable when printing models having hollow structures of intricate geometries (e.g., twisted thin tunnels).

FIG. 10 presents photographs demonstrating the support material removal from an object made according to Geometry 2 mode using an FG formulation according to the present embodiments. As shown therein, by application of small pressure, the hardened support material is easily removed to thereby reveal a hollow tubular structure.

FIG. 11 presents photographs demonstrating the support material removal from an object made according to FIG. 6B according to the present embodiments.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of additive manufacturing of a three-dimensional object, the method comprising sequentially forming a plurality of layers in a configured pattern corresponding to a shape of the object, thereby forming the object, wherein the formation of at least a few of said layers comprises:

dispensing at least two building material formulations, said at least two building material formulations comprise a modeling material formulation which, upon exposure to a curing condition, forms a hardened modeling material, and a support material formulation which, upon exposure to said curing condition, forms a hardened support material, wherein said support material formulation comprises:

at least one monofunctional curable material;

at least one hydrophilic multifunctional curable material; and at least one water-miscible non-curable material, wherein:

a total amount of said at least one monofunctional curable material ranges from 1 to 10, % by weight, of the total weight of the formulation;

a total amount of said at least one hydrophilic multifunctional curable material ranges from 1 to 5, % by weight, of the total weight of the formulation;

a weight ratio of a total weight of said at least one monofunctional curable material and a total weight of said at least one hydrophilic multifunctional curable material ranges from 1:1 to 10:1; and a total amount of said non-curable materials is at least 85% by weight of the total weight of the support material formulation.

2. The method of claim 1, wherein said dispensing is such that said hardened modeling material forms at least one hollow structure, and said hardened support material is at least partially enclosed in said hollow structure.

3. The method according to claim 2, wherein said hollow structure is selected from a tubular structure, a branched tubular structure, and a plurality of tubular structures entangled with one another.

4. The method of claim 3, wherein a diameter of said tubular structures is less than 1 cm.

5. The method of claim 3, wherein said hardened support material is completely enclosed in said hollow structure.

6. The method of claim 1, wherein said at least one hydrophilic multifunctional curable material provides, when hardened per se, a material that is water-insoluble.

7. The method of claim 1, wherein at least one of said monofunctional curable material(s) comprises a hydrophilic monofunctional curable material.

8. The method of claim 1, wherein at least one of said monofunctional curable material(s) comprises a hydroxyalkyl and/or an alkylene glycol moiety.

9. The method of claim 1, wherein said at least one non-curable material comprises a polymeric material.

10. The method of claim 1, wherein said support material formulation comprises:

said at least one monofunctional curable material, in an amount of from 3 to 10, % by weight;

said at least one hydrophilic multifunctional curable material in an amount of from 3 to 5, % by weight;

at least one polymeric non-curable material in an amount of from 30 to 60, % by weight; and at least one non-polymeric non-curable material in an amount of from 30 to 60, % by weight.

11. The method of claim 1, wherein said hardened support material features a gel material that is flowable upon application of positive pressure.

* * * * *